US012125237B2

(12) United States Patent
Matsunaga

(10) Patent No.: US 12,125,237 B2
(45) Date of Patent: Oct. 22, 2024

(54) INFORMATION PROCESSING APPARATUS, INFORMATION PROCESSING METHOD, PROGRAM, MOBILE-OBJECT CONTROL APPARATUS, AND MOBILE OBJECT

(71) Applicant: Sony Semiconductor Solutions Corporation, Kanagawa (JP)

(72) Inventor: Dai Matsunaga, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 715 days.

(21) Appl. No.: 17/298,453

(22) PCT Filed: Nov. 22, 2019

(86) PCT No.: PCT/JP2019/045742
§ 371 (c)(1),
(2) Date: May 28, 2021

(87) PCT Pub. No.: WO2020/116194
PCT Pub. Date: Jun. 11, 2020

(65) Prior Publication Data
US 2022/0058428 A1 Feb. 24, 2022

(30) Foreign Application Priority Data
Dec. 7, 2018 (JP) .................................. 2018-230060

(51) Int. Cl.
*G06T 7/73* (2017.01)
*G01S 13/42* (2006.01)
(Continued)

(52) U.S. Cl.
CPC ................ *G06T 7/73* (2017.01); *G01S 13/42* (2013.01); *G01S 17/89* (2013.01); *G06F 18/214* (2023.01);
(Continued)

(58) Field of Classification Search
CPC ...... G06T 7/73; G06V 2201/07; G06V 20/56; G06F 18/253
See application file for complete search history.

(56) References Cited

U.S. PATENT DOCUMENTS

2018/0082137 A1   3/2018  Melvin et al.
2018/0284256 A1  10/2018  Sutou et al.
(Continued)

FOREIGN PATENT DOCUMENTS

EP    3 358 369 A1    8/2018
JP    2005-175603 A   6/2005
(Continued)

OTHER PUBLICATIONS

Xiaozhi Chen et al: "Multi-View 3D Object Detection Network for Autonomous Driving", arxiv.org, Cornell University Library, 201 Olin Library Cornell University Ithaca, NY 14853, Nov. 23, 2016, (Year: 2017).*
(Continued)

*Primary Examiner* — Myron Wyche
(74) *Attorney, Agent, or Firm* — Wolf, Greenfield & Sacks, P.C.

(57) ABSTRACT

The present technology relates to an information processing apparatus, an information processing method, a program, a mobile-object control apparatus, and a mobile object that make it possible to improve the accuracy in recognizing a target object.

An information processing apparatus includes an image processor that generates an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the (Continued)

image sensor; and an object recognition section that performs processing of recognizing the target object on the basis of the captured image and the estimated-location image. The present technology is applicable to, for example, a system used to recognize a target object around a vehicle.

18 Claims, 18 Drawing Sheets

(51) Int. Cl.
*G01S 17/89* (2020.01)
*G06F 18/214* (2023.01)
*G06F 18/25* (2023.01)
*G06V 10/764* (2022.01)
*G06V 10/82* (2022.01)
*G06V 20/56* (2022.01)
*G06V 20/58* (2022.01)

(52) U.S. Cl.
CPC .......... *G06F 18/253* (2023.01); *G06V 10/764* (2022.01); *G06V 10/82* (2022.01); *G06V 20/56* (2022.01); *G06V 20/58* (2022.01); *G06T 2207/10028* (2013.01); *G06T 2207/10044* (2013.01); *G06T 2207/20081* (2013.01); *G06T 2207/20084* (2013.01); *G06T 2207/30252* (2013.01); *G06V 2201/07* (2022.01)

(56) References Cited

U.S. PATENT DOCUMENTS

| | | |
|---|---|---|
| 2018/0308281 A1 | 10/2018 | Okoyama |
| 2019/0286982 A1 | 9/2019 | Ambai |
| 2020/0177798 A1* | 6/2020 | Parekh .................. G06N 3/063 |
| 2020/0408890 A1* | 12/2020 | Klar ...................... G01S 13/878 |

FOREIGN PATENT DOCUMENTS

| | | |
|---|---|---|
| JP | 2008204102 A | 9/2008 |
| JP | 2017-102838 A | 6/2017 |
| JP | 2018195097 A | 12/2018 |
| WO | WO 2017/057056 A1 | 4/2017 |
| WO | WO 2017/171005 A1 | 10/2017 |
| WO | WO 2018/016608 A1 | 1/2018 |
| WO | WO 2018/052714 A2 | 3/2018 |
| WO | WO-2018208939 A | 11/2018 |

OTHER PUBLICATIONS

International Search Report and English translation thereof mailed Feb. 18, 2020 in connection with International Application No. PCT/JP2019/045742.

International Written Opinion and English translation thereof mailed Feb. 18, 2020 in connection with International Application No. PCT/JP2019/045742.

International Preliminary Report on Patentability and English translation thereof mailed Jun. 17, 2021 in connection with International Application No. PCT/JP2019/045742. Issued.

Extended European Search Report issued Jan. 4, 2022 in connection with European Application No. 19891899.7.

Chen et al., Multi-View 3D Object Detection Network for Autonomous Driving. arXiv preprint arXiv:1611.07759. Nov. 23, 2016. 9 pages.

Dou et al., Boosting cnn-based pedestrian detection via 3d lidar fusion in autonomous driving. International Conference on Image and Graphics. Springer. Sep. 13, 2017;3-13.

Kim et al., Robust Deep Multi-modal Learning Based on Gated Information Fusion Network. arXiv preprint arXiv:1807.06233. Jul. 17, 2018. 16 pages.

Liang et al., Deep Continuous Fusion for Multi-sensor 3D Object Detection. European Conference on Computer Vision. Springer. Sep. 8, 2018; 663-78.

Vaquero et al., Deconvolutional Networks for Point-Cloud Vehicle Detection and Tracking in Driving Scenarios. arXiv preprint arXiv:1808.07935. Aug. 23, 2018. 7 pages.

Peng, Xi et al., "Learning face recognition from limited training data using deep neural networks", 2016 23rd International Conference on Pattern Recognition (ICPR) [online], IEEE, Dec. 2016, pp. 1442-1447.

Takahiro, "Web image filtering service", Image Laboratory, Japan Industrial Publishing Co., Ltd., Jan. 10, 2017, vol. 28, No. 2, pp. 62-69.

* cited by examiner

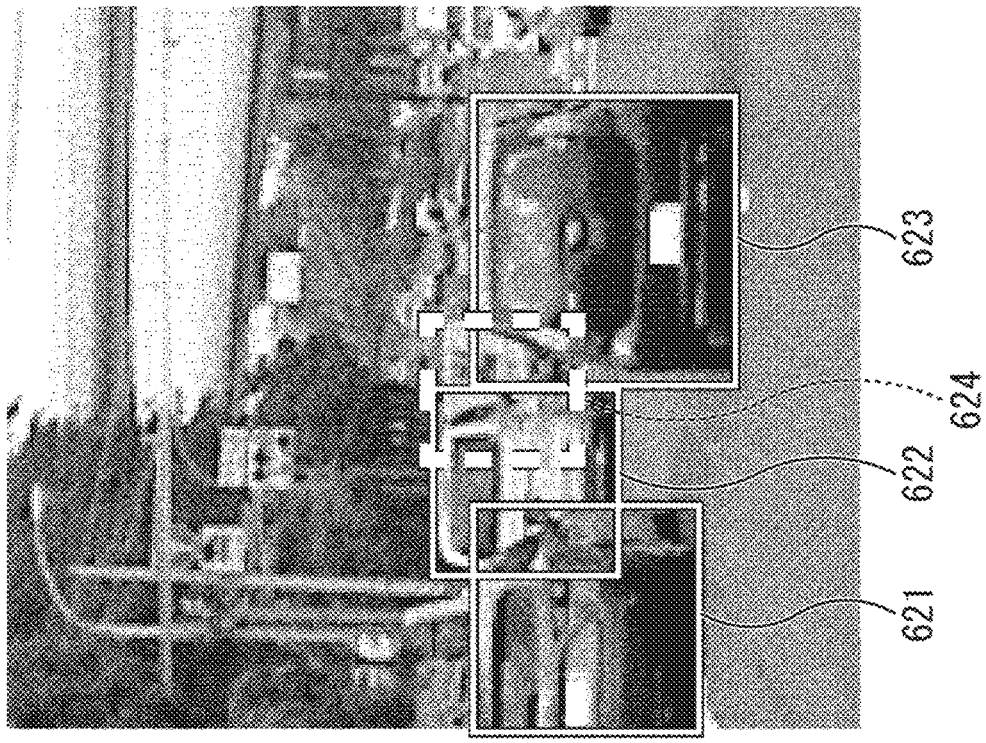
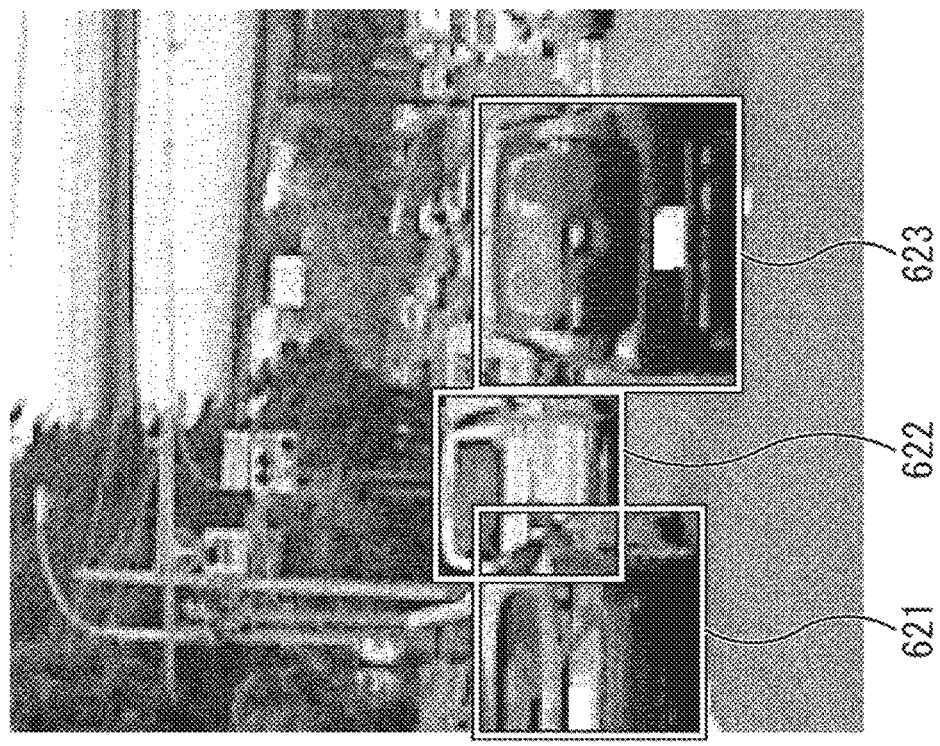
FIG. 13

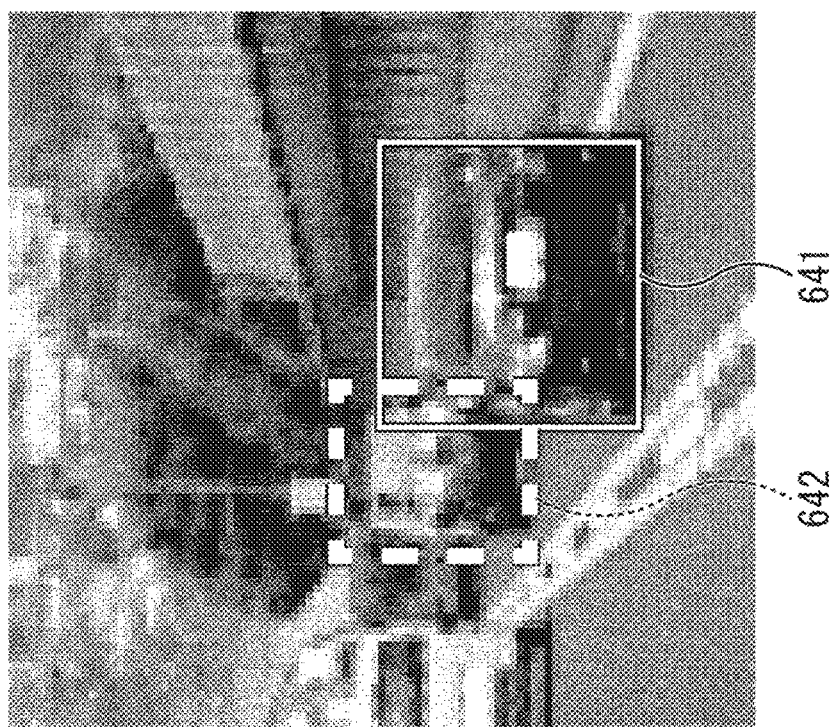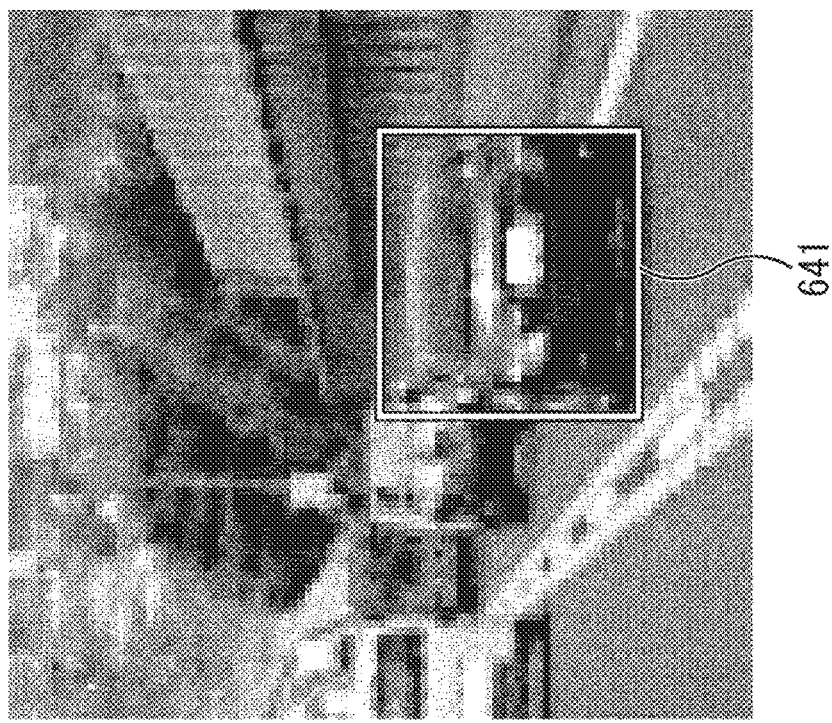
FIG.14

INFORMATION PROCESSING APPARATUS, INFORMATION PROCESSING METHOD, PROGRAM, MOBILE-OBJECT CONTROL APPARATUS, AND MOBILE OBJECT

CROSS-REFERENCE TO RELATED APPLICATIONS

The present application claims the benefit under 35 U.S.C. § 371 as a U.S. National Stage Entry of International Application No. PCT/JP2019/045742, filed in the Japanese Patent Office as a Receiving Office on Nov. 22, 2019, which claims priority to Japanese Patent Application Number JP2018-230060, filed in the Japanese Patent Office on Dec. 7, 2018, each of which applications is hereby incorporated by reference in its entirety.

TECHNICAL FIELD

The present technology relates to an information processing apparatus, an information processing method, a program, a mobile-object control apparatus, and a mobile object, and in particular, to an information processing apparatus, an information processing method, a program, a mobile-object control apparatus, and a mobile object that are intended to improve the accuracy in recognizing a target object.

BACKGROUND ART

It has been proposed, in the past, that location information regarding an obstacle that is detected by a millimeter-wave radar be superimposed to be displayed on a camera image using a projection transformation performed with respect to a radar plane and a camera-image plane (for example, refer to Patent Literature 1).

CITATION LIST

Patent Literature

Patent Literature 1: Japanese Patent Application Laid-open No. 2005-175603

DISCLOSURE OF INVENTION

Technical Problem

However, Patent Literature 1 does not discuss improving the accuracy in recognizing a target object such as a vehicle using a camera and a millimeter-wave radar.

The present technology has been made in view of the circumstances described above, and is intended to improve the accuracy in recognizing a target object.

Solution to Problem

An information processing apparatus according to a first aspect of the present technology includes an image processor that generates an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and an object recognition section that performs processing of recognizing the target object on the basis of the captured image and the estimated-location image.

An information processing method according to the first aspect of the present technology includes generating, by the information processing apparatus, an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and performing, by the information processing apparatus, processing of recognizing the target object on the basis of the captured image and the estimated-location image.

A program according to the first aspect of the present technology causes a computer to perform a process including generating an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and performing processing of recognizing the target object on the basis of the captured image and the estimated-location image.

A mobile-object control apparatus according to a second aspect of the present technology includes an image processor that generates an estimated-location image on the basis of a sensor image that indicates, in a first coordinate system, a sensing result of a sensor of which a sensing range at least partially overlaps a sensing range of an image sensor that captures an image of surroundings of a mobile object, the estimated-location image indicating an estimated location of a target object in a second coordinate system identical to a coordinate system of a captured image obtained by the image sensor; an object recognition section that performs processing of recognizing the target object on the basis of the captured image and the estimated-location image; and a movement controller that controls movement of the mobile object on the basis of a result of the recognition of the target object.

A mobile-object control apparatus according to a third aspect of the present technology includes an image sensor; a sensor of which a sensing range at least partially overlaps a sensing range of the image sensor; an image processor that generates an estimated-location image on the basis of a sensor image that indicates a sensing result of the sensor in a first coordinate system, the estimated-location image indicating an estimated location of a target object in a second coordinate system identical to a coordinate system of a captured image obtained by the image sensor; an object recognition section that performs processing of recognizing the target object on the basis of the captured image and the estimated-location image; and a movement controller that controls movement on the basis of a result of the recognition of the target object.

In the first aspect of the present technology, an estimated-location image is generated on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and processing of recognizing the target object is performed on the basis of the captured image and the estimated-location image.

In the second aspect of the present technology, an estimated-location image is generated on the basis of a sensor image that indicates, in a first coordinate system, a sensing result of a sensor of which a sensing range at least partially overlaps a sensing range of an image sensor that captures an image of surroundings of a mobile object, the estimated-location image indicating an estimated location of a target object in a second coordinate system identical to a coordinate system of a captured image obtained by the image sensor; processing of recognizing the target object is performed on the basis of the captured image and the estimated-location image; and movement of the mobile object is controlled on the basis of a result of the recognition of the target object.

In the third aspect of the present technology, an estimated-location image is generated on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; processing of recognizing the target object is performed on the basis of the captured image and the estimated-location image; and movement is controlled on the basis of a result of the recognition of the target object.

BRIEF DESCRIPTION OF DRAWINGS

FIG. 13 is a diagram for describing the effects provided by the present technology.

FIG. 14 is a diagram for describing the effects provided by the present technology.

MODE(S) FOR CARRYING OUT THE INVENTION

Figure 1:
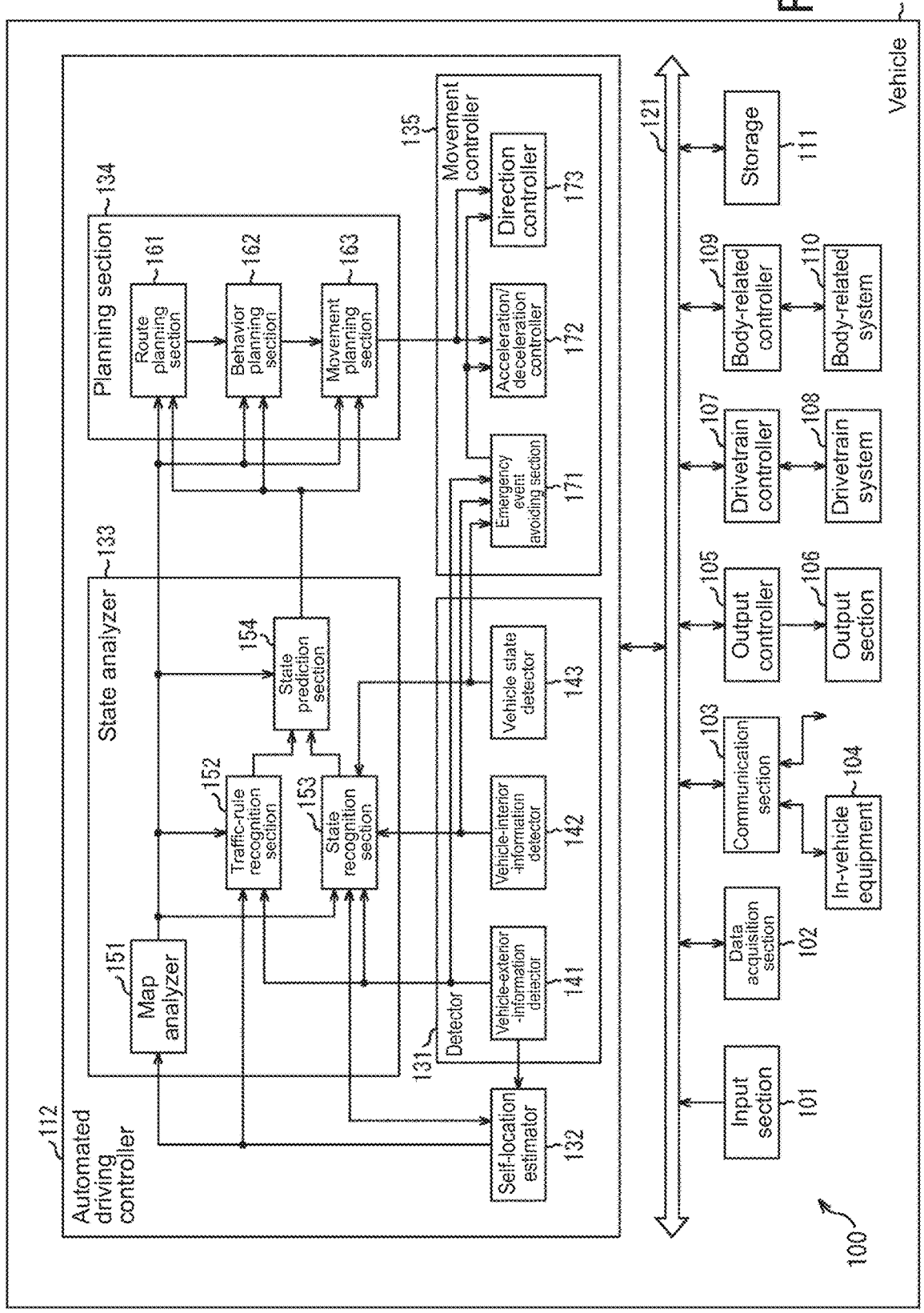
FIG. 1 is a block diagram illustrating an example of a configuration of a vehicle control system to which the present technology is applied.

Embodiments for carrying out the present technology are described below. The description is made in the following order.
1. First Embodiment (Example of Using Camera and Millimeter-Wave Radar)
2. Second Embodiment (Example of Adding LiDAR)
3. Modifications
4. Others 1. First Embodiment First, a first embodiment of the present technology is described with reference to FIGS. 1 to 14.
<Example of Configuration of Vehicle Control System 100>
FIG. 1 is a block diagram illustrating an example of a schematic functional configuration of a vehicle control system 100 that is an example of a mobile-object control system to which the present technology is applicable.

Note that, when a vehicle 10 provided with the vehicle control system 100 is to be distinguished from other vehicles, the vehicle provided with the vehicle control system 100 will be hereinafter referred to as an own automobile or an own vehicle.

The vehicle control system 100 includes an input section 101, a data acquisition section 102, a communication section 103, in-vehicle equipment 104, an output controller 105, an output section 106, a drivetrain controller 107, a drivetrain system 108, a body-related controller 109, a body-related system 110, a storage 111, and an automated driving controller 112. The input section 101, the data acquisition section 102, the communication section 103, the output controller 105, the drivetrain controller 107, the body-related controller 109, the storage 111, and the automated driving controller 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input section 101 and the automated driving controller 112 communicate with each other through the communication network 121, it will be simply stated that the input section 101 and the automated driving controller 112 communicate with each other.

The input section 101 includes an apparatus used by a person on board to input various pieces of data, instructions, and the like. For example, the input section 101 includes an operation device such as a touch panel, a button, a microphone, a switch, and a lever; an operation device with which input can be performed by a method other than a manual operation, such as sound or a gesture; and the like. Alternatively, for example, the input section 101 may be externally connected equipment such as a remote-control apparatus using infrared or another radio wave, or mobile equipment or wearable equipment compatible with an operation of the vehicle control system 100. The input section 101 generates an input signal on the basis of data, an instruction, or the like input by a person on board, and supplies the generated input signal to the respective structural elements of the vehicle control system 100.

The data acquisition section 102 includes various sensors and the like for acquiring data used for a process performed by the vehicle control system 100, and supplies the acquired data to the respective structural elements of the vehicle control system 100.

For example, the data acquisition section 102 includes various sensors used to detect, for example, a state of the own automobile. Specifically, for example, the data acquisition section 102 includes a gyroscope; an acceleration sensor; an inertial measurement unit (IMU); and a sensor or the like used to detect an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition section 102 includes various sensors used to detect information regarding the outside of the own automobile. Specifically, for example, the data acquisition section 102 includes an image-capturing apparatus such as a time-of-flight (ToF) camera, a stereo camera, a monocular camera, an infrared camera, and other cameras. Furthermore, for example, the data acquisition section 102 includes an environment sensor used to detect weather, a meteorological phenomenon, or the like, and a surrounding-information detection sensor used to detect an object around the own automobile. For example, the environment sensor includes a raindrop sensor, a fog sensor, a sunshine sensor, a snow sensor, and the like. The surrounding-information detection sensor includes an ultrasonic sensor, a radar, LiDAR (light detection and ranging, laser imaging detection and ranging), a sonar, and the like.

Moreover, for example, the data acquisition section 102 includes various sensors used to detect the current location of the own automobile. Specifically, for example, the data acquisition section 102 includes, for example, a global navigation satellite system (GNSS) receiver that receives a GNSS signal from a GNSS satellite.

Further, for example, the data acquisition section 102 includes various sensors used to detect information regarding the inside of a vehicle. Specifically, for example, the data acquisition section 102 includes an image-capturing apparatus that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication section 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication section 103 is not particularly limited. It is also possible for the communication section 103 to support a plurality of types of communication protocols.

For example, the communication section 103 wirelessly communicates with the in-vehicle equipment 104 using a wireless LAN, Bluetooth (registered trademark), near-field communication (NFC), a wireless USB (WUSB), or the like. Further, for example, the communication section 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication section 103 communicates with equipment (for example, an application server or a control server) situated in an external network (for example, the Internet, a cloud network, or a carrier-specific network) through a base station or an access point. Furthermore, for example, the communication section 103 communicates with a terminal (for example, a terminal of a pedestrian or a store, or a machine-type communication (MTC) terminal) situated near the own automobile, using a peer-to-peer (P2P) technology. Moreover, for example, the communication section 103 performs V2X communication such as vehicle-to-vehicle communication, vehicle-to-infrastructure communication, vehicle-to-home communication between the own automobile and a home, and vehicle-to-pedestrian communication. Further, for example, the communication section 103 includes a beacon receiver, receives a radio wave or an electromagnetic wave transmitted from, for example, a radio station installed on a road, and acquires information regarding, for example, the current location, traffic congestion, traffic regulation, or a necessary time.

Examples of the in-vehicle equipment 104 include mobile equipment or wearable equipment of a person on board, information equipment that is brought in or attached to the own automobile, and a navigation apparatus that searches for a route to any destination.

The output controller 105 controls output of various pieces of information to a person on board of the own automobile or to the outside of the own automobile. For example, the output controller 105 generates an output signal that includes at least one of visual information (such as image data) or audio information (such as sound data), supplies the output signal to the output section 106, and thereby controls output of the visual information and the audio information from the output section 106. Specifically, for example, the output controller 105 combines pieces of data of images captured by different image-capturing apparatuses of the data acquisition section 102, generates a bird's-eye image, a panoramic image, or the like, and supplies an output signal including the generated image to the output section 106. Further, for example, the output controller 105 generates sound data including, for example, a warning beep or a warning message alerting a danger such as collision, contact, or entrance into a dangerous zone, and supplies an output signal including the generated sound data to the output section 106.

The output section 106 includes an apparatus capable of outputting the visual information or the audio information to a person on board of the own automobile or to the outside of the own automobile. For example, the output section 106 includes a display apparatus, an instrument panel, an audio speaker, headphones, a wearable device such as an eyeglass-type display used to be worn on the person on board, a projector, a lamp, and the like. Instead of an apparatus including a commonly used display, the display apparatus included in the output section 106 may be an apparatus, such as a head-up display, a transparent display, or an apparatus including an augmented reality (AR) display function, that displays the visual information in the field of view of a driver.

The drivetrain controller 107 generates various control signals, supplies them to the drivetrain system 108, and thereby controls the drivetrain system 108. Further, the drivetrain controller 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism used to transmit the driving force to wheels, a steering mechanism that adjusts the steering angle, a braking apparatus that generates a braking force, an antilock braking system (ABS), an electronic stability control (ESC) system, an electric power steering apparatus, and the like.

The body-related controller 109 generates various control signals, supplies them to the body-related system 110, and thereby controls the body-related system 110. Further, the body-related controller 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as a headlamp, a tail lamp, a brake lamp, a blinker, and a fog lamp), and the like.

For example, the storage 111 includes a read only memory (ROM), a random access memory (RAM), a magnetic storage device such as a hard disc drive (HDD), a semiconductor storage device, an optical storage device, a magneto-optical storage device, and the like. The storage 111 stores therein various programs, data, and the like that are used by the respective structural elements of the vehicle control system 100. For example, the storage 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving controller 112 performs control related to automated driving such as autonomous traveling or a driving assistance. Specifically, for example, the automated driving controller 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, and the like. Further, for example, the automated driving controller 112 performs a cooperative control intended to achieve, for example, automated driving that is autonomous traveling without an operation performed by a driver. The automated driving controller 112 includes a detector 131, a self-location estimator 132, a state analyzer 133, a planning section 134, and a movement controller 135.

The detector 131 detects various pieces of information necessary to control automated driving. The detector 131 includes a vehicle-exterior-information detector 141, a vehicle-interior-information detector 142, and a vehicle state detector 143.

The vehicle-exterior-information detector 141 performs a process of detecting information regarding the outside of the own automobile on the basis of data or a signal from each structural element of the vehicle control system 100. For example, the vehicle-exterior-information detector 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detector 141 performs a process of detecting an environment surrounding the own automobile. Examples of the detection-target surrounding environment include weather, temperature, humidity, brightness, and a road surface condition. The vehicle-exterior-information detector 141 supplies data indicating a result of the detection process to, for example, the self-location estimator 132; a map analyzer 151, a traffic-rule recognition section 152, and a state recognition section 153 of the state analyzer 133; and an emergency event avoiding section 171 of the movement controller 135.

The vehicle-interior-information detector 142 performs a process of detecting information regarding the inside of a vehicle on the basis of data or a signal from each structural element of the vehicle control system 100. For example, the vehicle-interior-information detector 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detector 142 supplies data indicating a result of the detection process to, for example, the state recognition section 153 of the state analyzer 133 and the emergency event avoiding section 171 of the movement controller 135.

The vehicle state detector 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle state detector 143 supplies data indicating a result of the detection process to, for example, the state recognition section 153 of the state analyzer 133 and the emergency event avoiding section 171 of the movement controller 135.

The self-location estimator 132 performs a process of estimating a location, a posture, and the like of the own automobile on the basis of data or signals from the respective structural elements of the vehicle control system 100, such as the vehicle-exterior-information detector 141, and the state recognition section 153 of the state analyzer 133. Further, the self-location estimator 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimator 132 supplies data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the own automobile and its surroundings. The state analyzer 133 includes the map analyzer 151, the traffic-rule recognition section 152, the state recognition section 153, and a state prediction section 154.

Using, as necessary, data or signals from the respective structural elements of the vehicle control system 100, such as the self-location estimator 132 and the vehicle-exterior-information detector 141, the map analyzer 151 performs a process of analyzing various maps stored in the storage 111, and constructs a map including information necessary for an automated driving process. The map analyzer 151 supplies the constructed map to, for example, the traffic-rule recognition section 152, the state recognition section 153, and the state prediction section 154, as well as a route planning section 161, a behavior planning section 162, and a movement planning section 163 of the planning section 134.

The traffic-rule recognition section 152 performs a process of recognizing traffic rules around the own automobile on the basis of data or signals from the respective structural elements of the vehicle control system 100, such as the self-location estimator 132, the vehicle-exterior-information detector 141, and the map analyzer 151. The recognition process makes it possible to recognize a location and a state of a traffic light around the own automobile, the details of traffic control performed around the own automobile, and a travelable lane. The traffic-rule recognition section 152 supplies data indicating a result of the recognition process to, for example, the state prediction section 154.

The state recognition section 153 performs a process of recognizing a state related to the own automobile on the basis of data or signals from the respective structural elements of the vehicle control system 100, such as the self-location estimator 132, the vehicle-exterior-information detector 141, the vehicle-interior-information detector 142, the vehicle state detector 143, and the map analyzer 151. For example, the state recognition section 153 performs a process of recognizing a state of the own automobile, a state of the surroundings of the own automobile, a state of a driver of the own automobile, and the like. Further, the state recognition section 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition section 153 supplies data indicating a result of the recognition process (including a state recognition map as necessary) to, for example, the self-location estimator 132 and the state prediction section 154. Further, the state recognition section 153 stores the state-recognition map in the storage 111.

The state prediction section 154 performs a process of predicting a state related to the own automobile on the basis of data or signals from the respective structural elements of the vehicle control system 100, such as the map analyzer 151, the traffic-rule recognition section 152, and the state recognition section 153. For example, the state prediction section 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction section 154 supplies data indicating a result of the prediction process to, for example, the route planning section 161, the behavior planning section 162, and the movement planning section 163 of the planning section 134 together with the data from the traffic-rule recognition section 152 and the state recognition section 153.

The route planning section 161 plans a route to a destination on the basis of data or signals from the respective structural elements of the vehicle control system 100, such as the map analyzer 151 and the state prediction section 154. For example, the route planning section 161 sets a route from the current location to a specified destination on the basis of a global map. Further, for example, the route planning section 161 changes a route as appropriate on the basis of the states of, for example, traffic congestion, an accident, traffic regulation, and a construction, as well as the physical condition of a driver. The route planning section 161 supplies data indicating the planned route to, for example, the behavior planning section 162.

On the basis of data or signals from the respective structural elements of the vehicle control system 100, such as the map analyzer 151 and the state prediction section 154, the behavior planning section 162 plans the behavior of the own automobile in order for the own automobile to travel safely on the route planned by the route planning section 161 within a time planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 supplies data indicating the planned behavior of the own automobile to, for example, the movement planning section 163.

On the basis of data or signals from the respective structural elements of the vehicle control system 100, such as the map analyzer 151 and the state prediction section 154, the movement planning section 163 plans movement of the own automobile in order to achieve the behavior planned by the behavior planning section 162. For example, the movement planning section 163 makes plans about, for example, acceleration, deceleration, and a traveling course. The movement planning section 163 supplies data indicating the planned movement of the own automobile to, for example, an acceleration/deceleration controller 172 and a direction controller 173 of the movement controller 135.

The movement controller 135 controls movement of the own automobile. The movement controller 135 includes the emergency event avoiding section 171, the acceleration/deceleration controller 172, and the direction controller 173.

On the basis of a result of the detections performed by the vehicle-exterior-information detector 141, the vehicle-interior-information detector 142, and the vehicle state detector 143, the emergency event avoiding section 171 performs a process of detecting emergency events such as collision, contact, entrance into a dangerous zone, something unusual in a driver, and anomaly in the vehicle. When the emergency event avoiding section 171 detects the occurrence of an emergency event, the emergency event avoiding section 171 plans movement of the own automobile such as a sudden stop or a quick turning for avoiding the emergency event. The emergency event avoiding section 171 supplies data indicating the planned movement of the own automobile to, for example, the acceleration/deceleration controller 172 and the direction controller 173.

The acceleration/deceleration controller 172 controls acceleration/deceleration to achieve the movement of the own automobile planned by the movement planning section 163 or the emergency event avoiding section 171. For example, the acceleration/deceleration controller 172 computes a control target value for a driving force generation apparatus or a braking apparatus to achieve the planned acceleration, the planned deceleration, or the planned sudden stop, and supplies a control instruction indicating the computed control target value to the drivetrain controller 107.

The direction controller 173 controls a direction to achieve the movement of the own automobile planned by the movement planning section 163 or the emergency event avoiding section 171. For example, the direction controller 173 computes a control target value for a steering mechanism to achieve the traveling course planned by the movement planning section 163 or the quick turning planned by the emergency event avoiding section 171, and supplies a control instruction indicating the computed control target value to the drivetrain controller 107.

<Examples of Configurations of Data Acquisition Section 102A and Vehicle-Exterior-Information Detector 141A>

Figure 2:
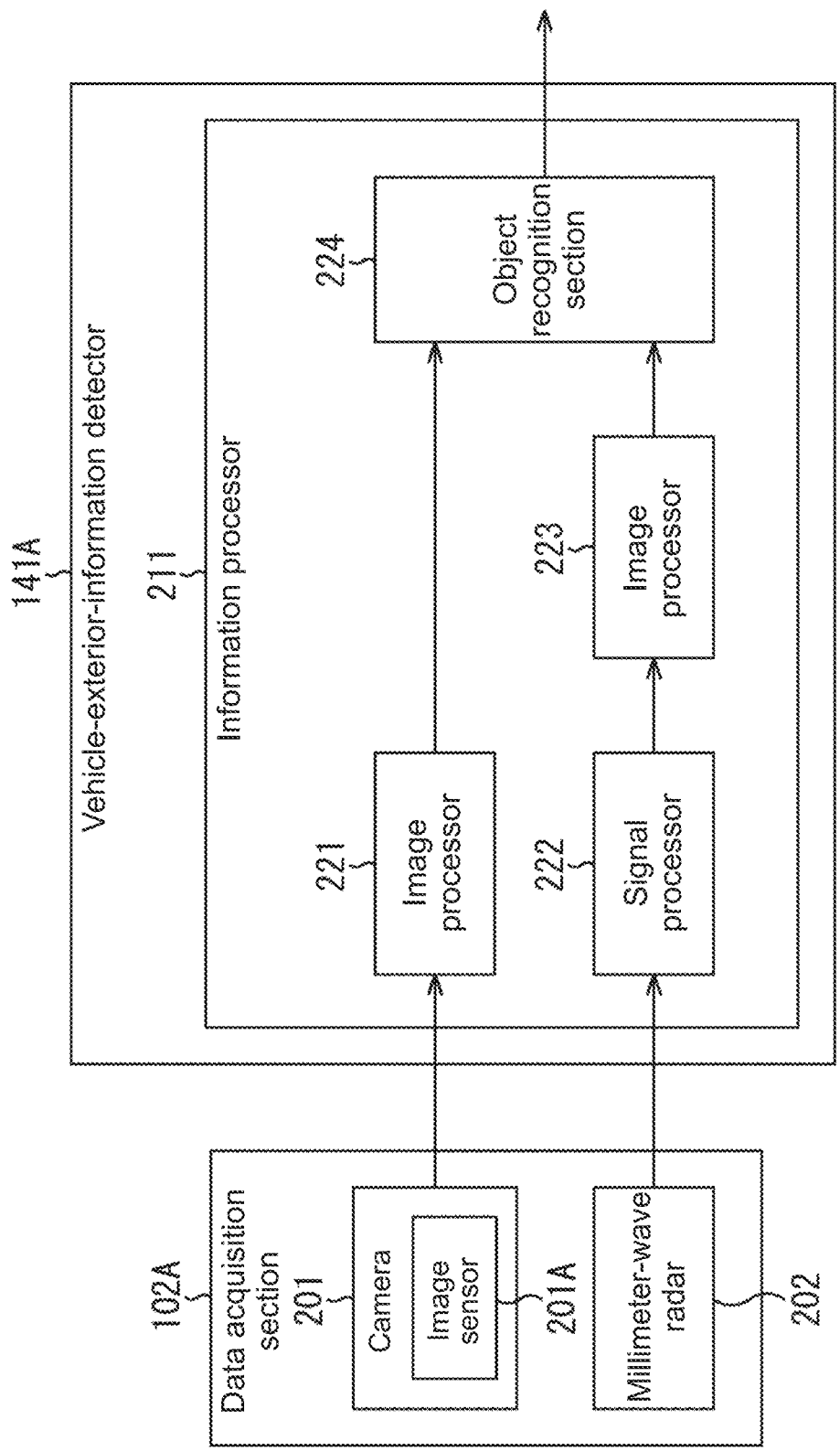
FIG. 2 is a block diagram illustrating a first embodiment of a data acquisition section and a first embodiment of a vehicle-exterior-information detector.

FIG. 2 illustrates portions of examples of configurations of a data acquisition section 102A that is a first embodiment of the data acquisition section 102 in the vehicle control system 100 of FIG. 1, and a vehicle-exterior-information detector 141A that is a first embodiment of the vehicle-exterior-information detector 141 in the vehicle control system 100 of FIG. 1.

The data acquisition section 102A includes a camera 201 and a millimeter-wave radar 202. The vehicle-exterior-information detector 141A includes an information processor 211. The information processor 211 includes an image processor 221, a signal processor 222, an image processor 223, and an object recognition section 224.

The camera 201 includes an image sensor 201A. Any type of image sensor such as a CMOS image sensor or a CCD image sensor can be used as the image sensor 201A. The camera 201 (the image sensor 201A) captures an image of a region situated ahead of the vehicle 10, and supplies the obtained image (hereinafter referred to as a captured image) to the image processor 221.

The millimeter-wave radar 202 performs sensing with respect to the region situated ahead of the vehicle 10, and sensing ranges of the millimeter-wave radar 202 and the camera 201 at least partially overlap. For example, the millimeter-wave radar 202 transmits a transmission signal including a millimeter wave in a forward direction of the vehicle 10, and receives, using a reception antenna, a reception signal that is a signal reflected off an object (a reflector) situated ahead of the vehicle 10. For example, a plurality of reception antennas is arranged at specified intervals in a lateral direction (a width direction) of the vehicle 10. Further, a plurality of reception antennas may also be arranged in the height direction. The millimeter-wave radar 202 supplies the signal processor 222 with data (hereinafter referred to as millimeter-wave data) that chronologically indicates the intensity of a reception signal received using each reception antenna.

The image processor 221 performs specified image processing on a captured image. For example, the image processor 221 performs processing of interpolating a red (R) component, a green (G) component, and a blue (B) component for each pixel of the captured image to generate an R image made up of the R component of the captured image, a G image made up of the G component of the captured image, and a B image made up of the B component of the captured image. The image processor 221 supplies the R image, the G image, and the B image to the object recognition section 224.

The signal processor 222 performs specified signal processing on millimeter-wave data to generate a millimeter-wave image that is an image indicating a result of sensing performed by the millimeter-wave radar 202. The signal processor 222 supplies the millimeter-wave image to the image processor 223.

The image processor 223 performs specified image processing on the millimeter-wave image to generate an estimated-location image indicating an estimated location of a target object of which a coordinate system is identical to the coordinate system of a captured image. The image processor 223 supplies the estimated-location image to the object recognition section 224.

The object recognition section 224 performs processing of recognizing a target object situated ahead of the vehicle 10 on the basis of the R image, the G image, the B image, and the estimated-location image. The object recognition section 224 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

Note that the target object is an object to be recognized by the object recognition section 224, and any object may be set to be the target object. However, it is favorable that an object that includes a portion having a high reflectivity of a transmission signal of the millimeter-wave radar 202 be set to be a target object. The case in which the target object is a vehicle is appropriately described below as an example.

<Example of Configuration of Image Processing Model 301>

Figure 3:
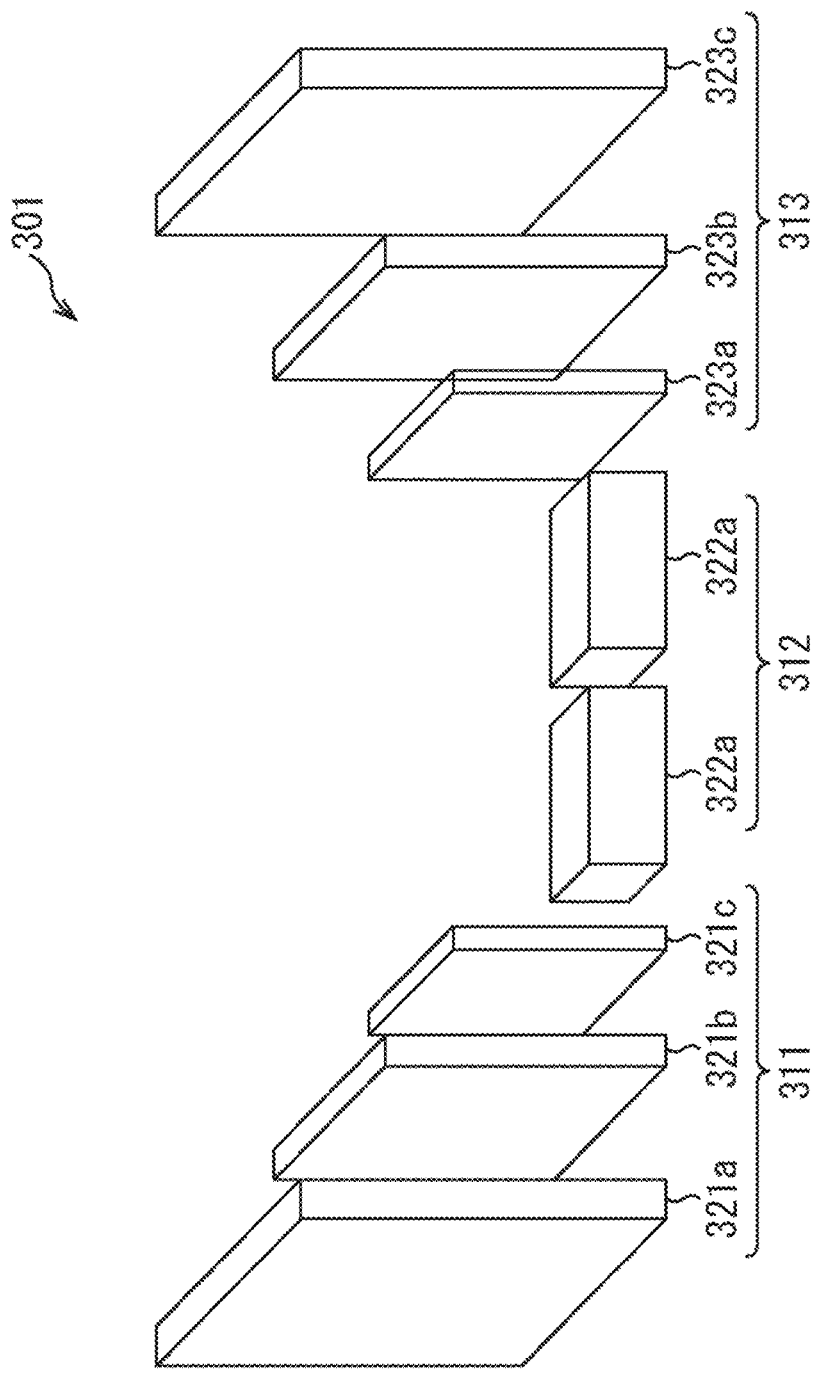
FIG. 3 illustrates an example of a configuration of an image processing model.

FIG. 3 illustrates an example of a configuration of the image processing model 301 used for the image processor 223.

The image processing model 301 is a model obtained by machine learning. Specifically, the image processing model 301 is a model obtained by deep learning that is a type of machine learning and uses a deep neural network. The image processing model 301 includes a feature-amount extraction section 311, a geometric transformation section 312, and a deconvolution section 313.

The feature-amount extraction section 311 includes a convolutional neural net. Specifically, the feature-amount extraction section 311 includes convolutional layers 321a to 321c. The convolutional layers 321a to 321c perform a convolution operation to extract a feature amount of a millimeter-wave image, generate a feature map indicating a distribution of a feature amount in a coordinate system identical to the coordinate system of the millimeter-wave image, and supply the feature map to the geometric transformation section 312.

The geometric transformation section 312 includes geometric transformation layers 322a and 322b. The geometric transformation layers 322a and 322b perform a geometric transformation on a feature map to transform the coordinate system of the feature map from the coordinate system of a millimeter-wave image to the coordinate system of a captured image. The geometric transformation section 312 supplies the deconvolution section 313 with the feature map on which the geometric transformation has been performed.

The deconvolution section 313 includes deconvolutional layers 323a to 323c. The deconvolutional layers 323a to 323c deconvolve the feature map on which the geometric transformation has been performed to generate and output an estimated-location image.

<Example of Configuration of Object Recognition Model 351>

Figure 4:
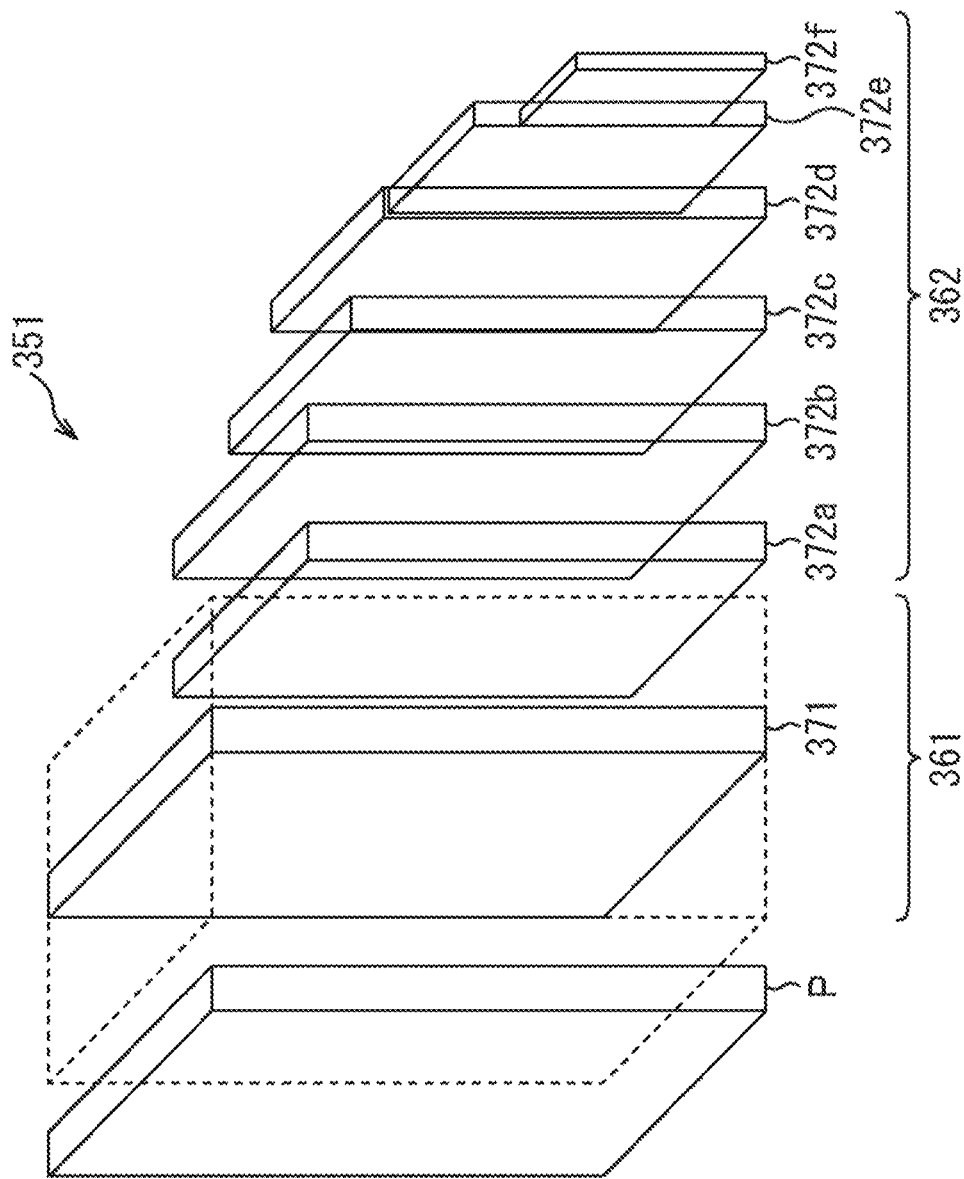
FIG. 4 illustrates an example of a configuration of an object recognition model.

FIG. 4 illustrates an example of a configuration of an object recognition model 351 used for the object recognition section 224.

The object recognition model 351 is a model obtained by machine learning. Specifically, the object recognition model 351 is a model obtained by deep learning that is a type of machine learning and uses a deep neural network. More specifically, the object recognition model 351 is made up of Single Shot MultiBox Detector (SSD), which is one of the object recognition models using a deep neural network. The object recognition model 351 includes a feature-amount extraction section 361 and a recognition section 362.

The feature-amount extraction section 361 includes VGG16 371, which is a convolutional layer using a convolutional neural network. Four-channel image data P that includes an R image, a G image, a B image, and an estimated-location image is input to the VGG16 371. The VGG16 371 extracts each of the feature amounts of the R image, the G image, the B image, and the estimated-location image, and generates a combining feature map two-dimensionally representing a distribution of a feature amount obtained by combining the feature amounts extracted from the respective images. The combining feature map represents a distribution of a feature amount in a coordinate system identical to the coordinate system of a captured image. The VGG16 371 supplies the combining feature map to the recognition section 362.

The recognition section 362 includes a convolutional neural network. Specifically, the recognition section 362 includes convolutional layers 372a to 372f.

The convolutional layer 372a performs a convolution operation on the combining feature map. The convolutional layer 372a performs processing of recognizing a target object on the basis of the combining feature map on which the convolution operation has been performed. The convolutional layer 372a supplies the convolutional layer 372b with the combining feature map on which the convolution operation has been performed.

The convolutional layer 372b performs a convolution operation on the combining feature map supplied by the convolutional layer 372a. The convolutional layer 372b performs processing of recognizing the target object on the basis of the combining feature map on which the convolution operation has been performed. The convolutional layer 372b supplies the convolutional layer 372c with the combining feature map on which the convolution operation has been performed.

The convolutional layer 372c performs a convolution operation on the combining feature map supplied by the convolutional layer 372b. The convolutional layer 372c performs processing of recognizing the target object on the basis of the combining feature map on which the convolution operation has been performed. The convolutional layer 372c supplies the convolutional layer 372d with the combining feature map on which the convolution operation has been performed.

The convolutional layer 372d performs a convolution operation on the combining feature map supplied by the convolutional layer 372c. The convolutional layer 372d performs processing of recognizing the target object on the basis of the combining feature map on which the convolution operation has been performed. The convolutional layer 372d supplies the convolutional layer 372e with the combining feature map on which the convolution operation has been performed.

The convolutional layer 372e performs a convolution operation on the combining feature map supplied by the convolutional layer 372d. The convolutional layer 372e performs processing of recognizing the target object on the basis of the combining feature map on which the convolution operation has been performed. The convolutional layer 372e supplies the convolutional layer 372f with the combining feature map on which the convolution operation has been performed.

The convolutional layer 372f performs a convolution operation on the combining feature map supplied by the convolutional layer 372e. The convolutional layer 372f performs processing of recognizing the target object on the basis of the combining feature map on which the convolution operation has been performed.

The object recognition model 351 outputs data indicating a result of the recognition of the target object that is performed by the convolutional layers 372a to 372f.

Note that, in order from the convolutional layer 372a, the size (the number of pixels) of a combining feature map becomes smaller, and is smallest in the convolutional layer 372f. Further, if the combining feature map has a larger size, a target object having a small size, as viewed from the vehicle 10, is recognized with a higher degree of accuracy, and if the combining feature map has a smaller size, a target object having a large size, as viewed from the vehicle 10, is recognized with a higher degree of accuracy. Thus, for example, when the target object is a vehicle, a small distant vehicle is easily recognized in a combining feature map having a large size, and a large nearby vehicle is easily recognized in a combining feature map having a small size.

<Example of Configuration of Learning System 401>

Figure 5:
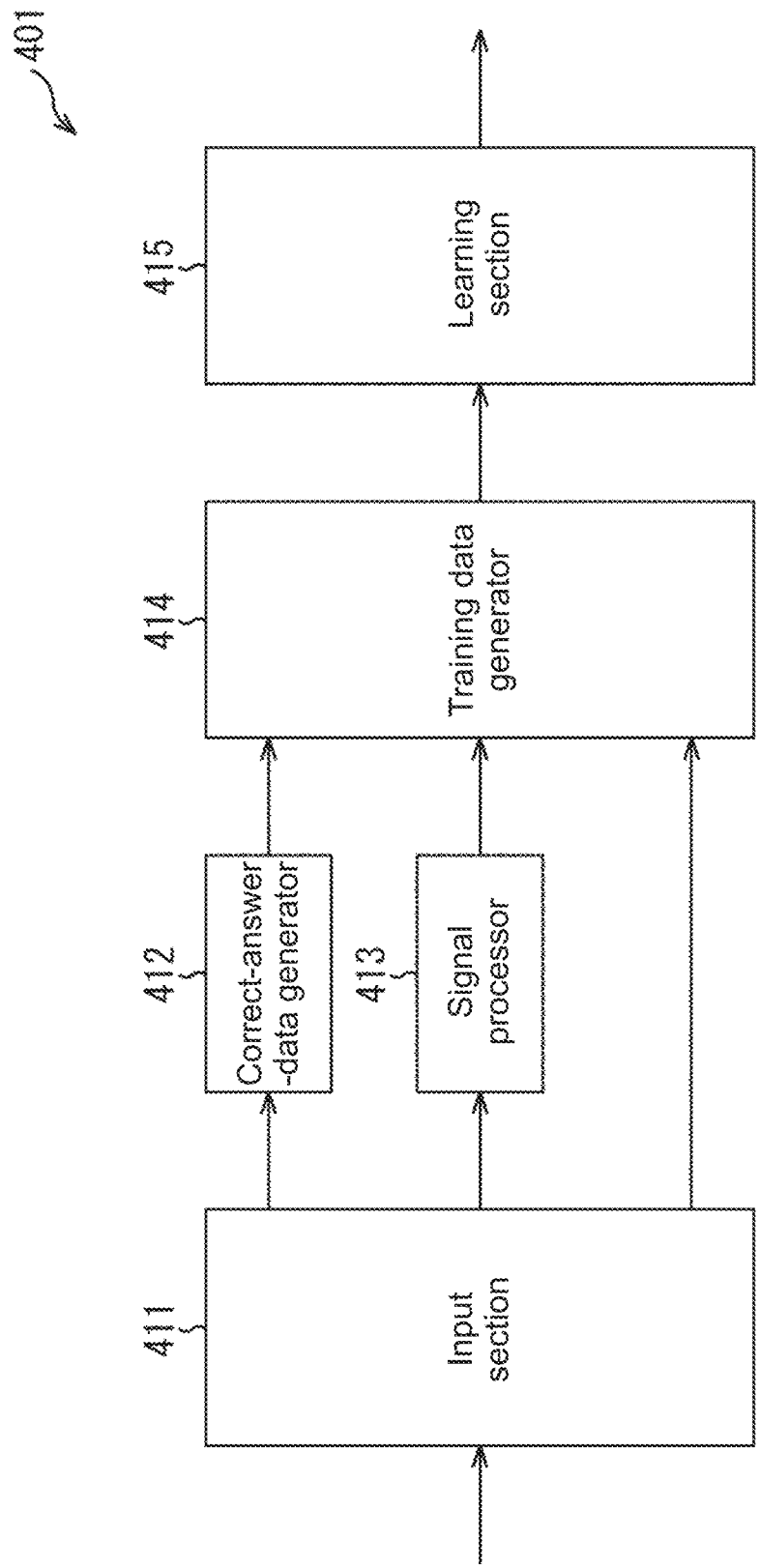
FIG. 5 illustrates an example of a configuration of a learning system for the image processing model.

FIG. 5 illustrates an example of a configuration of a learning system 401.

The learning system 401 performs learning processing on the image processing model 301 of FIG. 3. The learning system 401 includes an input section 411, a correct-answer-data generator 412, a signal processor 413, a training data generator 414, and a learning section 415.

The input section 411 includes various input devices, and is used for, for example, input of data necessary to generate training data, and an operation performed by a user. For example, the input section 411 supplies a captured image to the correct-answer-data generator 412 when the captured image is input. For example, the input section 411 supplies millimeter-wave data to the signal processor 413 when the millimeter-wave data is input. For example, the input section 411 supplies the correct-answer-data generator 412 and the training data generator 414 with data indicating an instruction of a user that is input by an operation performed by the user.

The correct-answer-data generator 412 generates correct answer data on the basis of the captured image. For example, a user specifies a location of a vehicle in the captured image through the input section 411. The correct-answer-data generator 412 generates correct answer data indicating the location of the vehicle in the captured image on the basis of the location of the vehicle that is specified by the user. The correct-answer-data generator 412 supplies the correct answer data to the training data generator 414.

The signal processor 413 performs processing similar to the processing performed by the signal processor 222 of FIG. 2. In other words, the signal processor 413 performs specified signal processing on millimeter-wave data to generate a millimeter-wave image. The signal processor 413 supplies the millimeter-wave image to the training data generator 414.

The training data generator 414 generates training data that includes input data and correct answer data, the input data including the millimeter-wave image. The training data generator 414 supplies the training data to the learning section 415.

The learning section 415 performs learning processing on the image processing model 301 using the training data. The learning section 415 outputs the image processing model 301 that has performed learning.

<Example of Configuration of Learning System 451>

Figure 6:
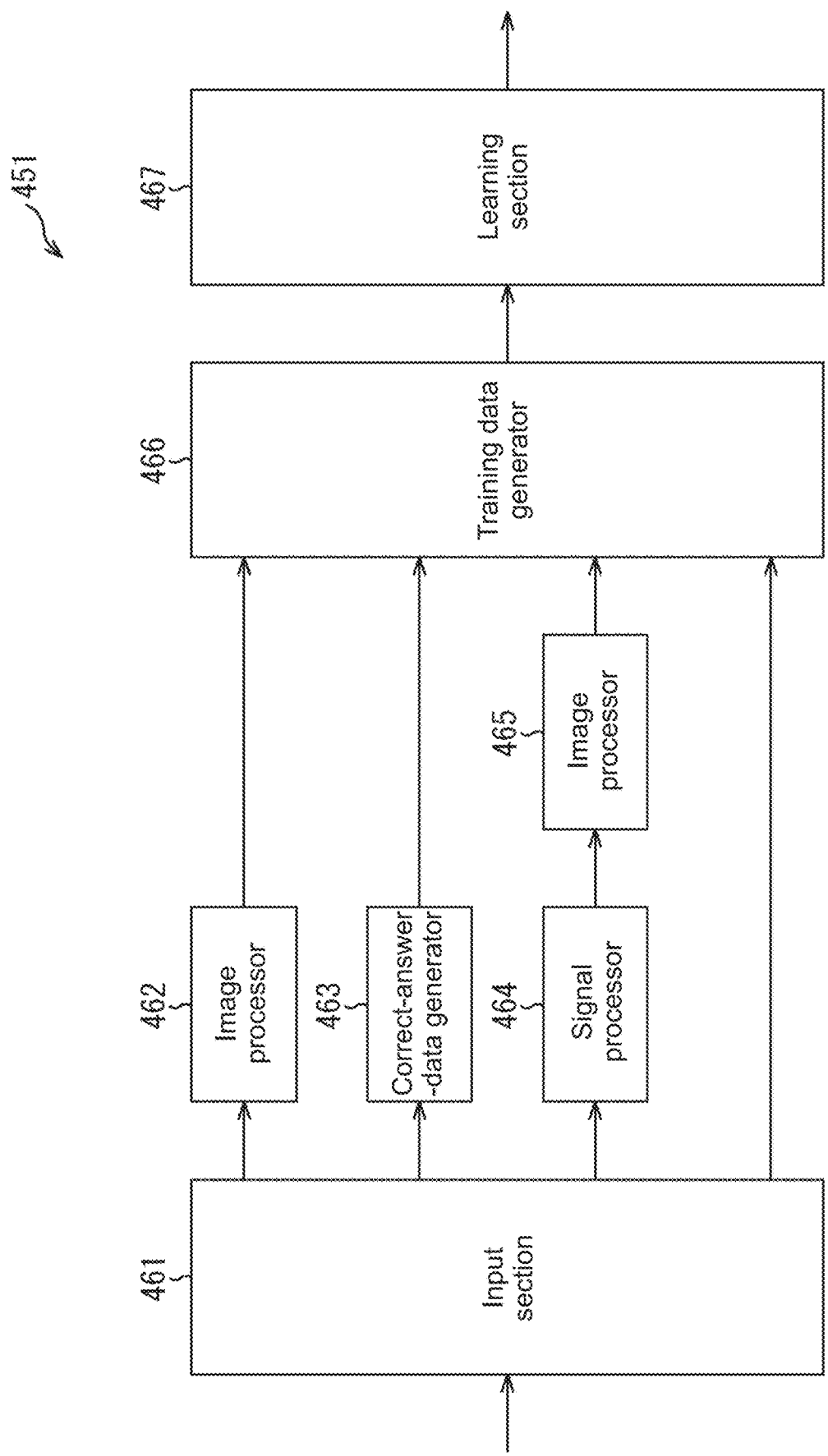
FIG. 6 illustrates an example of a configuration of a learning system for the object recognition model.

FIG. 6 illustrates an example of a configuration of a learning system 451.

The learning system 451 performs learning processing on the object recognition model 351 of FIG. 4. The learning system 451 includes an input section 461, an image processor 462, a correct-answer-data generator 463, a signal processor 464, an image processor 465, a training data generator 466, and a learning section 467.

The input section 461 includes various input devices, and is used for, for example, input of data necessary to generate training data, and an operation performed by a user. For example, the input section 461 supplies a captured image to the image processor 462 and the correct-answer-data generator 463 when the captured image is input. For example, the input section 461 supplies millimeter-wave data to the signal processor 464 when the millimeter-wave data is input. For example, the input section 461 supplies the correct-answer-data generator 463 and the training data generator 466 with data indicating an instruction of a user that is input by an operation performed by the user.

The image processor 462 performs processing similar to the processing performed by the image processor 221 of FIG. 2. In other words, the image processor 462 performs specified image processing on a captured image to generate an R image, a G image, and a B image. The image processor 462 supplies the R image, the G image, and the B image to the training data generator 466.

The correct-answer-data generator 463 generates correct answer data on the basis of the captured image. For example, a user specifies a location of a vehicle in the captured image through the input section 461. The correct-answer-data generator 463 generates correct answer data indicating the location of the vehicle in the captured image on the basis of the location of the vehicle that is specified by the user. The correct-answer-data generator 463 supplies the correct answer data to the training data generator 466.

The signal processor 464 performs processing similar to the processing performed by the signal processor 222 of FIG. 2. In other words, the signal processor 464 performs specified signal processing on millimeter-wave data to generate a millimeter-wave image. The signal processor 464 supplies the millimeter-wave image to the image processor 465.

The image processor 465 performs processing similar to the processing performed by the image processor 223 of FIG. 2. In other words, the image processor 465 generates an estimated-location image on the basis of the millimeter-wave image. The image processor 465 supplies the estimated-location image to the training data generator 466.

Note that the image processing model 301 that has performed learning is used for the image processor 465.

The training data generator 466 generates training data that includes input data and correct answer data, the input data including four-channel image data that includes the R image, the G image, the B image, and the estimated-location image. The training data generator 466 supplies the training data to the learning section 467.

The learning section 467 performs learning processing on the object recognition model 351 using the training data. The learning section 467 outputs the object recognition model 351 that has performed learning.

<Learning Processing Performed on Image Processing Model>

Next, learning processing on an image processing model that is performed by the learning system 401 is described with reference to a flowchart of FIG. 7.

Note that data used to generate training data is collected before this processing is started. For example, in a state in which the vehicle 10 is actually traveling, the camera 201 and the millimeter-wave radar 202 provided to the vehicle 10 perform sensing with respect to a region situated ahead of the vehicle 10. Specifically, the camera 201 captures an image of the region situated ahead of the vehicle 10, and stores an obtained captured image in the storage 111. The millimeter-wave radar 202 detects an object situated ahead of the vehicle 10, and stores obtained millimeter-wave data in the storage 111. The training data is generated on the basis of the captured image and millimeter-wave data accumulated in the storage 111.

In Step S1, the learning system 401 generates training data.

For example, a user inputs, to the learning system 401 and through the input section 411, a captured image and millimeter-wave data that are acquired at substantially the same time. In other words, the captured image and millimeter-wave data obtained by performing sensing at substantially the same point in time are input to the learning system 401. The captured image is supplied to the correct-answer-data generator 412, and the millimeter-wave data is supplied to the signal processor 413.

Further, the user specifies a region, in the captured image, in which there exists a target object. The correct-answer-data generator 412 generates correct answer data that includes a binary image indicating a region in which there exists the target object specified by the user.

Figure 8:
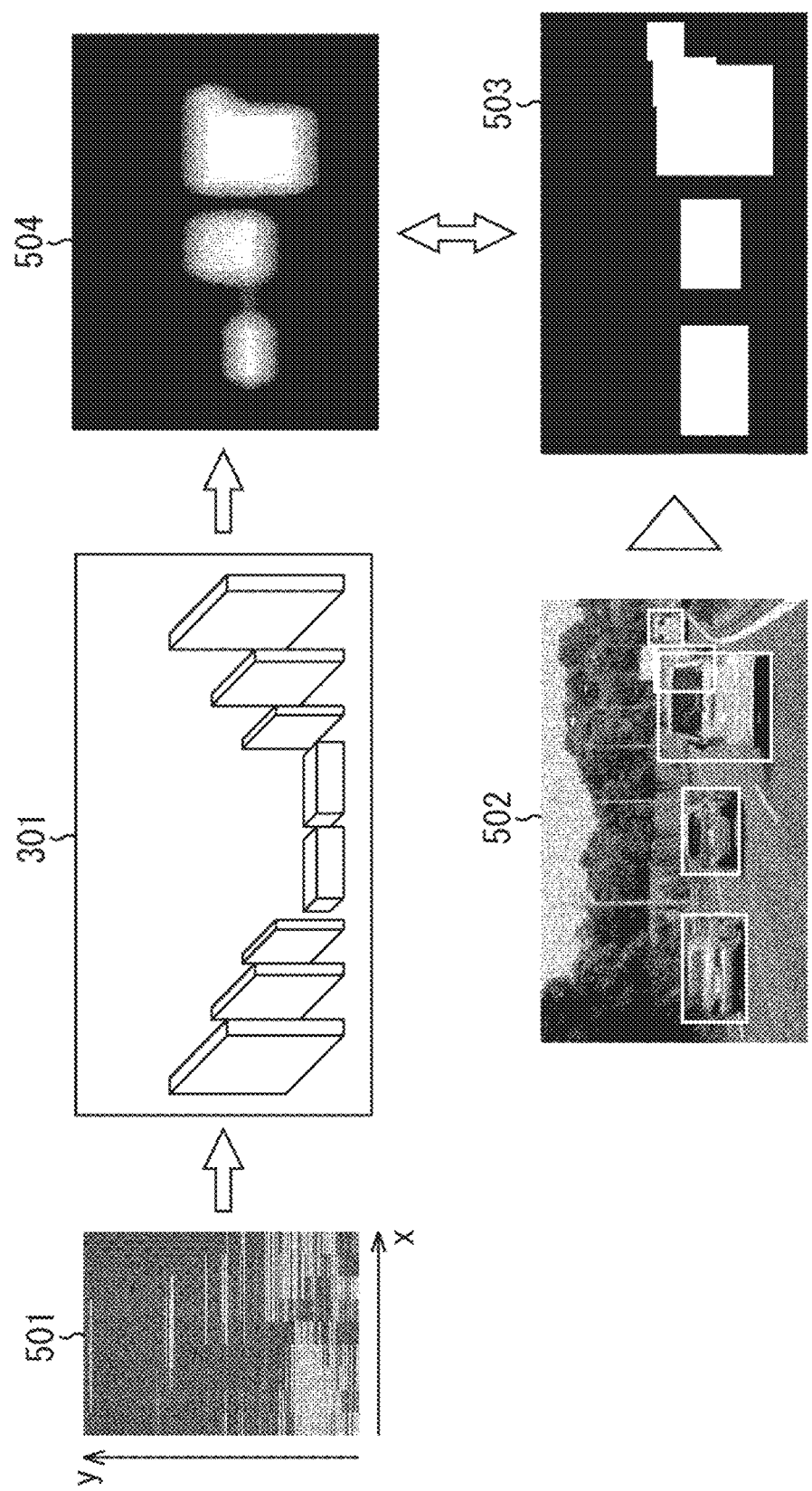
FIG. 8 is a diagram for describing the learning processing performed on the image processing model.

For example, through the input section 411, the user boxes off a region in which there exists a vehicle that is a target object in a captured image 502 of FIG. 8. The correct-answer-data generator 412 generates correct answer data 503 that is an image binarized by filling a boxed portion with solid white and the other portion with solid black.

The correct-answer-data generator 412 supplies the correct answer data to the training data generator 414.

The signal processor 413 performs specified signal processing on millimeter-wave data to estimate a location and a speed of an object off which a transmission signal has been reflected in a region situated ahead of the vehicle 10. The location of the object is represented by, for example, a distance from the vehicle 10 to the object, and a direction (an angle) of the object with respect to an optical-axis direction of the millimeter-wave radar 202 (a traveling direction of the vehicle 10). Note that, for example, when a transmission signal is radially transmitted, the optical-axis direction of the millimeter-wave radar 202 is the same as a direction of the center of a range in which the radial transmission is performed, and when scanning is performed with the transmission signal, the optical-axis direction of the millimeter-wave radar 202 is the same as a direction of the center of a range in which the scanning is performed. The speed of the object is represented by, for example, a relative speed of the object with respect to the vehicle 10. The signal processor 413 generates a millimeter-wave image on the basis of a result of estimating the location of the object.

For example, a millimeter-wave image 501 of FIG. 8 is generated. An x-axis of the millimeter-wave image 501 represents an angle of an object relative to an optical-axis direction of the millimeter-wave radar 202 (a traveling direction of the vehicle 10), and a y-axis of the millimeter-wave image 501 represents a distance to the object. Further, in the millimeter-wave image 501, the intensity of a signal (reception signal) reflected off the object situated in a location defined by the x-axis and the y-axis is indicated by color or concentration.

The signal processor 413 supplies the millimeter-wave image to the training data generator 414.

The training data generator 414 generates training data that includes input data and correct answer data, the input data including the millimeter-wave image. For example, training data that includes input data and correct answer data 503 is generated, the input data including the millimeter-wave image 501. The training data generator 414 supplies the generated training data to the learning section 415.

In Step S2, the learning section 415 causes an image processing model to perform learning. Specifically, the learning section 415 inputs the input data to the image processing model 301. The image processing model 301 generates an estimated-location image on the basis of the millimeter-wave image included in the input data.

For example, an estimated-location image 504 of FIG. 8 is generated on the basis of the millimeter-wave image 501. The estimated-location image 504 is a grayscale image of which a coordinate system is identical to the coordinate system of the captured image 502. The captured image 502 and the estimated-location image 504 are images of a region situated ahead of the vehicle 10, as viewed from the same viewpoint. In the estimated-location image 504, a pixel that is more likely to be included in a region in which there exists a target object, is brighter, and a pixel that is less likely to be included in the region in which there exists the target object, is darker.

The learning section 415 compares an estimated-location image with correct answer data, and adjusts, for example, a parameter of the image processing model 301 on the basis of a result of the comparison. For example, the learning section 415 compares the estimated-location image 504 with the correct answer data 503, and adjusts, for example, a parameter of the image processing model 301 such that the error is reduced.

In Step S3, the learning section 415 determines whether the learning is to be continuously performed. For example, when the learning performed by the image processing model 301 has not come to an end, the learning section 415 determines that the learning is to be continuously performed, and the process returns to Step S1.

Thereafter, the processes of Steps S1 to S3 are repeatedly performed until it is determined, in Step S3, that the learning is to be terminated.

On the other hand, the learning section 415 determines, in Step S3, that the learning performed by the image processing model 301 is to be terminated when, for example, the learning has come to an end, and the learning processing performed on the image processing model is terminated.

As described above, the image processing model 301 that has performed learning is generated.

<Learning Processing Performed on Object Recognition Model>

Figure 9:
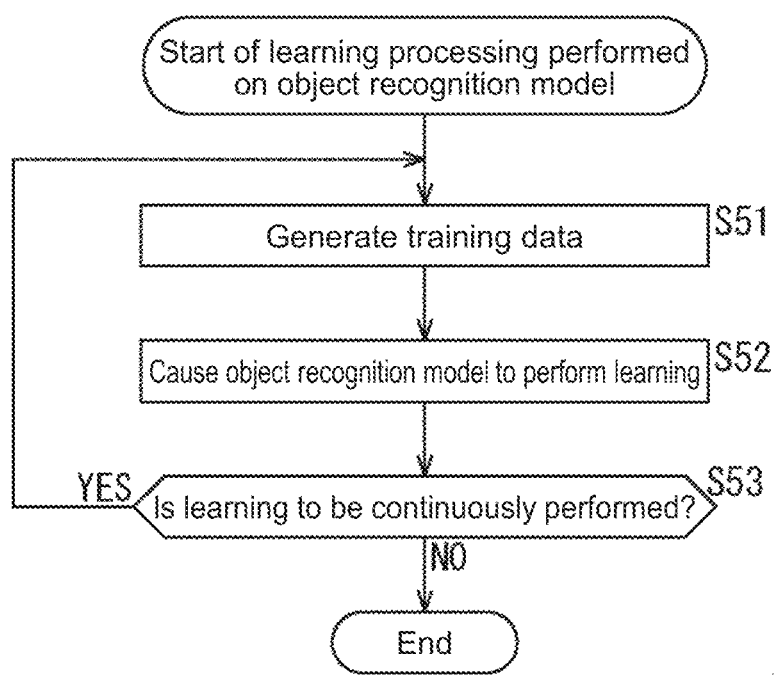
FIG. 9 is a flowchart for describing learning processing performed on the object recognition model.

Next, learning processing on an object recognition model that is performed by the learning system 451 is described with reference to a flowchart of FIG. 9.

Note that data used to generate training data is collected before this processing is started, as before the learning processing performed on an image processing model is started. Note that it is possible to use the same captured image and the same millimeter-wave data for the learning processing performed on an image processing model and the learning processing performed on an object recognition model.

In Step S51, the learning system 451 generates training data.

For example, a user inputs, to the learning system 451 and through the input section 461, a captured image and millimeter-wave data that are acquired at substantially the same time. In other words, the captured image and millimeter-wave data obtained by performing sensing at substantially the same point in time are input to the learning system 451. The captured image is supplied to the image processor 462 and the correct-answer-data generator 463, and the millimeter-wave data is supplied to the signal processor 464.

The image processor 462 performs processing of interpolating an R component, a G component, and a B component in each pixel of a captured image to generate an R image made up of the R component of the captured image, a G image made up of the G component of the captured image, and a B image made up of the B component of the captured image. For example, an R image 552R, a G image 552G, and a B image 552B are generated from a captured image 551 of FIG. 10. The image processor 462 supplies the R image, the G image, and the B image to the training data generator 466.

Figure 7:
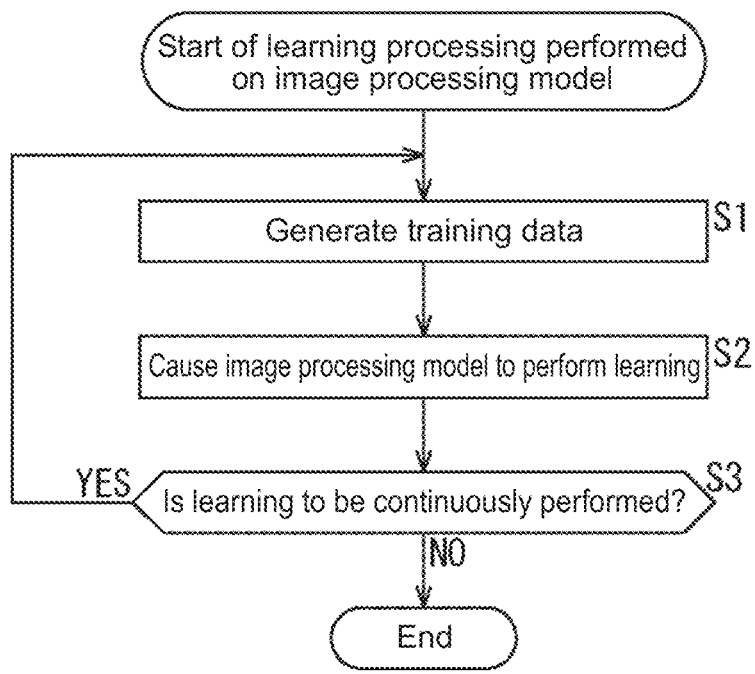
FIG. 7 is a flowchart for describing learning processing performed on the image processing model.
Figure 10:
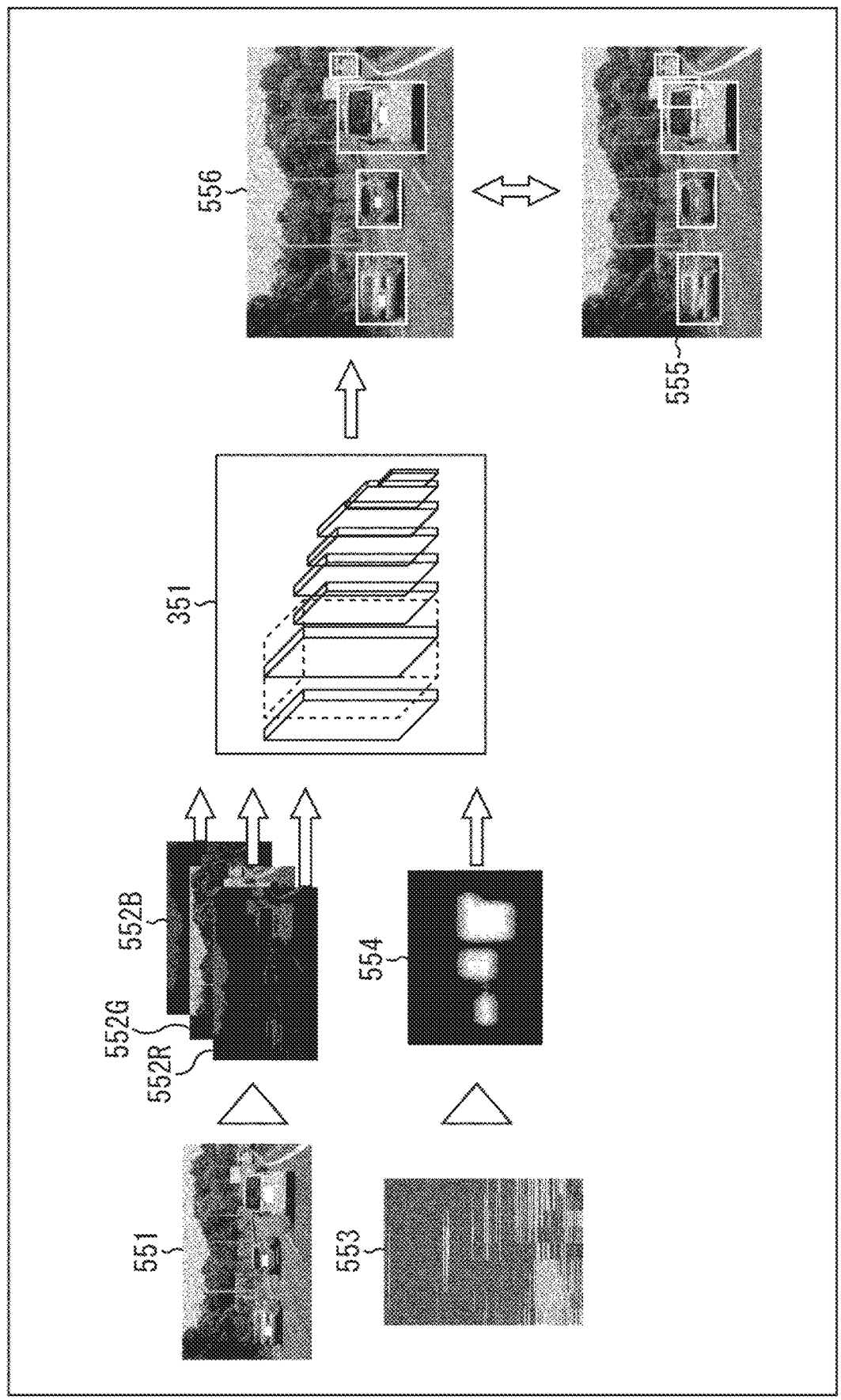
FIG. 10 is a diagram for describing the learning processing performed on the object recognition model.

The signal processor 464 performs processing similar to the processing performed by the signal processor 413 in Step S1 of FIG. 7 to generate a millimeter-wave image on the basis of the millimeter-wave data. For example, a millimeter-wave image 553 of FIG. 10 is generated. The signal processor 464 supplies the millimeter-wave image to the image processor 465.

The image processor 465 inputs the millimeter-wave image to the image processing model 301 to generate an estimated-location image. For example, an estimated-location image 554 of FIG. 10 is generated from the millimeter-wave image 553. The image processor 462 supplies the estimated-location image to the training data generator 466.

Further, through the input section 461, the user specifies a location, in the captured image, in which there exists a target object. The correct-answer-data generator 463 generates correct answer data indicating the location of a vehicle in the captured image on the basis of the location of the target object that is specified by the user. For example, correct answer data 555 of FIG. 10 that includes a boxed vehicle that is the target object in the captured image 551 is generated from the captured image 551. The correct-answer-data generator 463 supplies the correct answer data to the training data generator 466.

The training data generator 466 generates training data that includes input data and correct answer data, the input data including four-channel image data that are an R image, a G image, a B image, and an estimated-location image. For example, training data is generated that includes input data and correct answer data, the input data including four-channel image data that are the R image 552R, the G image 552G, the B image 552B, and the estimated-location image 554. The training data generator 466 supplies the training data to the learning section 467.

In Step S52, the learning section 467 causes the object recognition model 351 to perform learning. Specifically, the learning section 467 inputs the input data included in the training data to the object recognition model 351. The object recognition model 351 recognizes a target object in the captured image 551 on the basis of the R image, the G image, the B image, and the estimated-location image included in the input data, and generates recognition result data indicating a result of the recognition. For example, recognition result data 556 of FIG. 10 is generated. In the recognition result data 556, a vehicle that is the recognized target object is boxed.

The learning section 467 compares the recognition result data with the correct answer data, and adjusts, for example, a parameter of the object recognition model 351 on the basis of a result of the comparison. For example, the learning section 467 compares the recognition result data 556 with the correct answer data 555, and adjusts, for example, a parameter of the object recognition model 351 such that the error is reduced.

In Step S53, the learning section 467 determines whether the learning is to be continuously performed. For example, when the learning performed by the object recognition model 351 has not come to an end, the learning section 467 determines that the learning is to be continuously performed, and the process returns to Step S51.

Thereafter, the processes of Steps S51 to S53 are repeatedly performed until it is determined, in Step S53, that the learning is to be terminated.

On the other hand, the learning section 467 determines, in Step S53, that the learning performed by the object recognition model 351 is to be terminated when, for example, the learning has come to an end, and the learning processing performed on the object recognition model is terminated.

As described above, the object recognition model 351 that has performed learning is generated.

<Target-Object Recognition Processing>

Figure 11:
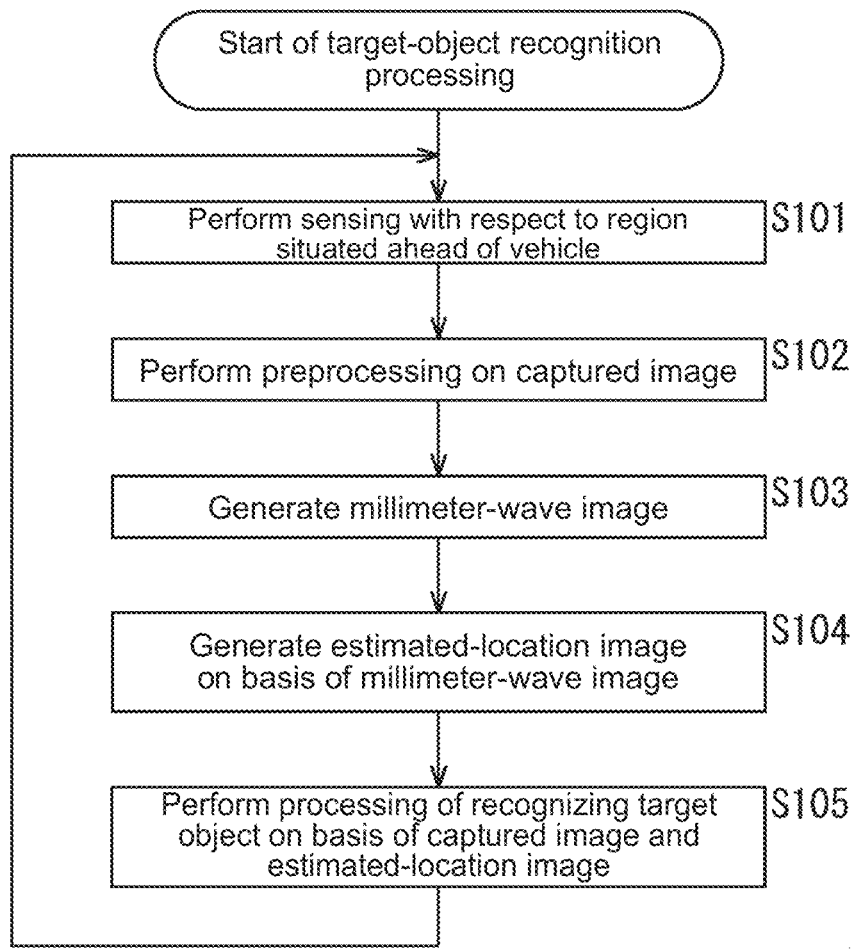
FIG. 11 is a flowchart for describing target-object recognition processing.

Next, target-object recognition processing performed by the vehicle 10 is described with reference to a flowchart of FIG. 11.

This processing is started when, for example, an operation for activating the vehicle 10 to start driving is performed, that is, when, for example, an ignition switch, a power switch, a start switch, or the like of the vehicle 10 is turned on. Further, this processing is terminated when, for example, an operation for terminating the driving of the vehicle 10 is performed, that is, when, for example, the ignition switch, the power switch, the start switch, or the like of the vehicle 10 is turned off.

In Step S101, the camera 201 and the millimeter-wave radar 202 perform sensing with respect to a region situated ahead of the vehicle 10.

Specifically, the camera 201 captures an image of a region situated ahead of the vehicle 10, and supplies the obtained captured image to the image processor 221.

The millimeter-wave radar 202 transmits a transmission signal in a forward direction of the vehicle 10, and receives, using a plurality of reception antennas, reception signals that are signals reflected off an object situated ahead of the vehicle 10. The millimeter-wave radar 202 supplies the signal processor 222 with millimeter-wave data that chronologically indicates the intensity of the reception signal received using each reception antenna.

In Step S102, the image processor 221 performs preprocessing on the captured image. Specifically, the image processor 221 performs processing similar to the processing performed by the image processor 462 in Step S51 of FIG. 9 to generate an R image, a G image, and a B image on the basis of the captured image. The image processor 221 supplies the R image, the G image, and the B image to the object recognition section 224.

In Step S103, the signal processor 222 generates a millimeter-wave image. Specifically, the signal processor 222 performs processing similar to the processing performed by the signal processor 413 in Step S1 of FIG. 7 to generate a millimeter-wave image on the basis of the millimeter-wave data. The signal processor 222 supplies the millimeter-wave image to the image processor 223.

In Step S104, the image processor 223 generates an estimated-location image on the basis of the millimeter-wave image. Specifically, the image processor 223 performs processing similar to the processing performed by the image processor 465 in Step S51 of FIG. 9 to generate an estimated-location image on the basis of the millimeter-wave image. The image processor 223 supplies the estimated-location image to the object recognition section 224.

In Step S105, the object recognition section 224 performs processing of recognizing a target object on the basis of the captured image and the estimated-location image. Specifically, the object recognition section 224 inputs, to the object recognition model 351, input data including four-channel image data that are the R image, the G image, the B image, and the estimated-location image. The object recognition model 351 performs processing of recognizing a target object situated ahead of the vehicle 10 on the basis of the input data.

The object recognition section 224 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

On the basis of, for example, the result of recognizing the target object, the self-location estimator 132 performs a process of estimating a location, a posture, and the like of the vehicle 10.

On the basis of, for example, the result of recognizing the target object, the map analyzer 151 performs a process of analyzing various maps stored in the storage 111, and constructs a map including information necessary for an automated driving process.

On the basis of, for example, the result of recognizing the target object, the traffic-rule recognition section 152 performs a process of recognizing traffic rules around the vehicle 10.

On the basis of, for example, the result of recognizing the target object, the state recognition section 153 performs a process of recognizing a state of the surroundings of the vehicle 10.

When the emergency event avoiding section 171 detects the occurrence of an emergency event on the basis of, for example, the result of recognizing the target object, the emergency event avoiding section 171 plans movement of the vehicle 10 such as a sudden stop or a quick turning for avoiding the emergency event.

Thereafter, the process returns to Step S101, and the processes of and after Step S101 are performed.

The accuracy in recognizing a target object situated ahead of the vehicle 10 can be improved as described above.

Figure 12:
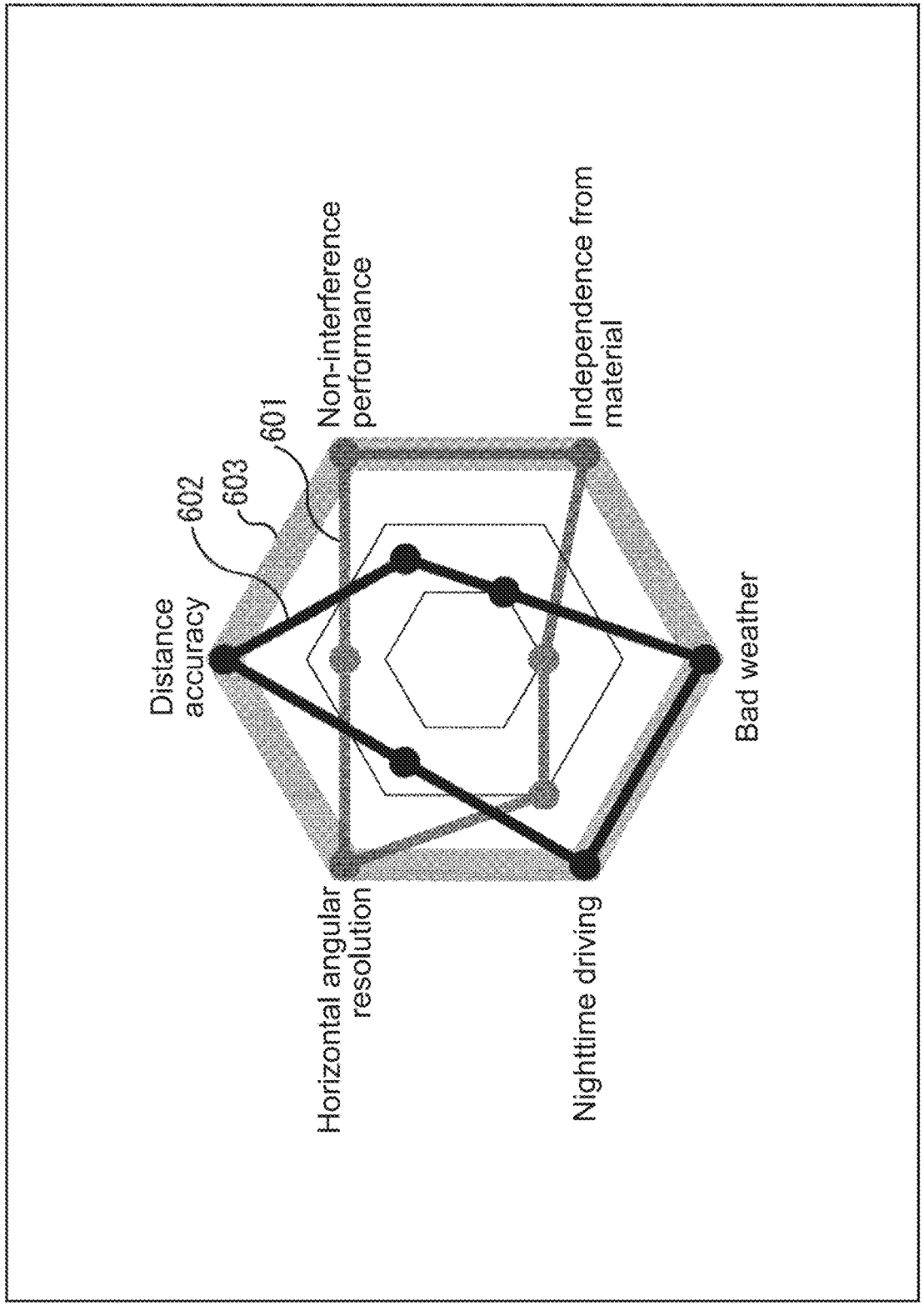
FIG. 12 is a diagram for describing effects provided by the present technology.

FIG. 12 is a radar chart of comparison in properties of recognizing a target object between the case of only using the camera 201 (the image sensor 201A), the case of only using the millimeter-wave radar 202, and the case of using both the camera 201 and the millimeter-wave radar 202. A chart 601 illustrates properties of recognition performed in the case of only using the camera 201. A chart 602 illustrates properties of recognition performed in the case of only using the millimeter-wave radar 202. A chart 603 illustrates properties of recognition performed in the case of using both the camera 201 and the millimeter-wave radar 202.

This radar chart is defined by six axes of distance accuracy, non-interference performance, independence from material, bad weather, nighttime driving, and horizontal angular resolution.

The axis of the distance accuracy represents an accuracy in detecting a distance to an object. This axis exhibits a larger value if the degree of accuracy in detecting a distance to an object is higher, and exhibits a smaller value if the degree of accuracy in detecting a distance to an object is lower.

The axis of a non-interference performance represents a state of being less susceptible to interference from other electromagnetic waves. This axis exhibits a larger value in a state of being less susceptible to interference from other electromagnetic waves, and exhibits a smaller value in a state of being more susceptible to the interference from other electromagnetic waves.

The axis of an independence from material represents whether the accuracy in recognition is less affected by the type of material. This axis exhibits a larger value if the degree of accuracy in recognition is less affected by the type of material, and exhibits a smaller value if the degree of accuracy in recognition is more greatly affected by the type of material.

The axis of bad weather represents the accuracy in recognizing an object during bad weather. This axis exhibits a larger value if the degree of accuracy in recognizing an object during bad weather is higher, and exhibits a smaller value if the degree of accuracy in recognizing an object during bad weather is lower.

The axis of a nighttime driving represents the accuracy in recognizing an object during a nighttime driving. This axis exhibits a larger value if the degree of accuracy in recognizing an object during a nighttime driving is higher, and exhibits a smaller value if the degree of accuracy in recognizing an object during a nighttime driving is lower.

The axis of a horizontal angular resolution represents a horizontal (lateral) angular resolution in a location of a recognized object. This axis exhibits a larger value if the horizontal angular resolution is higher, and exhibits a smaller value if the horizontal angular resolution is lower.

The camera 201 is superior to the millimeter-wave radar 202 in the items of a non-interference performance, an independence from material, and a horizontal angular resolution. On the other hand, the millimeter-wave radar 202 is superior to the camera 201 in the items of the distance accuracy, the accuracy in recognition during bad weather, and the accuracy in recognition during a nighttime driving. Thus, when both the camera 201 and the millimeter-wave radar 202 are used to fuse recognition results, this makes it possible to compensate for weaknesses of each other. This results in improving the accuracy in recognizing a target object.

For example, A of FIG. 13 illustrates an example of a recognition result obtained when processing of recognizing a vehicle is performed only using the camera 201, and B of FIG. 13 illustrates an example of a recognition result obtained when the processing of recognizing a vehicle is performed using both the camera 201 and the millimeter-wave radar 202.

In both cases, vehicles 621 to 623 are recognized. When only the camera 201 is used, this results in failing in recognizing a vehicle 624 that is partially hidden behind the vehicles 622 and 623. On the other hand, when both the camera 201 and the millimeter-wave radar 202 are used, this results in successfully recognizing the vehicle 624.

For example, A of FIG. 14 illustrates an example of a recognition result obtained when processing of recognizing a vehicle is performed only using the camera 201, and B of FIG. 14 illustrates an example of a recognition result obtained when the processing of recognizing a vehicle is performed using both the camera 201 and the millimeter-wave radar 202.

In both cases, a vehicle 641 is recognized. When only the camera 201 is used, this results in failing in recognizing a vehicle 642 of a unique color that has a unique shape. On the other hand, when both the camera 201 and the millimeter-wave radar 202 are used, this results in successfully recognizing the vehicle 642.

Further, when processing of recognizing a target object is performed using an estimated-location image instead of a millimeter-wave image, this results in improving the accuracy in recognizing the target object.

Specifically, a geometric transformation is performed on a millimeter-wave image to obtain an estimated-location image of which a coordinate system is matched to the coordinate system of a captured image, and the object recognition model 351 is caused to perform learning using the estimated-location image. This results in facilitating matching of each pixel of the captured image with a reflection point in the estimated-location image (a point at which the intensity of a reception signal is high), and in improving the accuracy in learning. Further, in the estimated-location image, there is a reduction in a component of a reception signal that is included in the millimeter-wave image and reflected off an object other than a target object situated ahead of the vehicle 10 (that is, a component unnecessary to perform processing of recognizing the target object). Thus, the use of an estimated-location image results in improving the accuracy in recognizing a target object.

2. Second Embodiment

Next, a second embodiment of the present technology is described with reference to FIG. 15.

<Examples of Configurations of Data Acquisition Section 102B and Vehicle-Exterior-Information Detector 141B>

Figure 15:
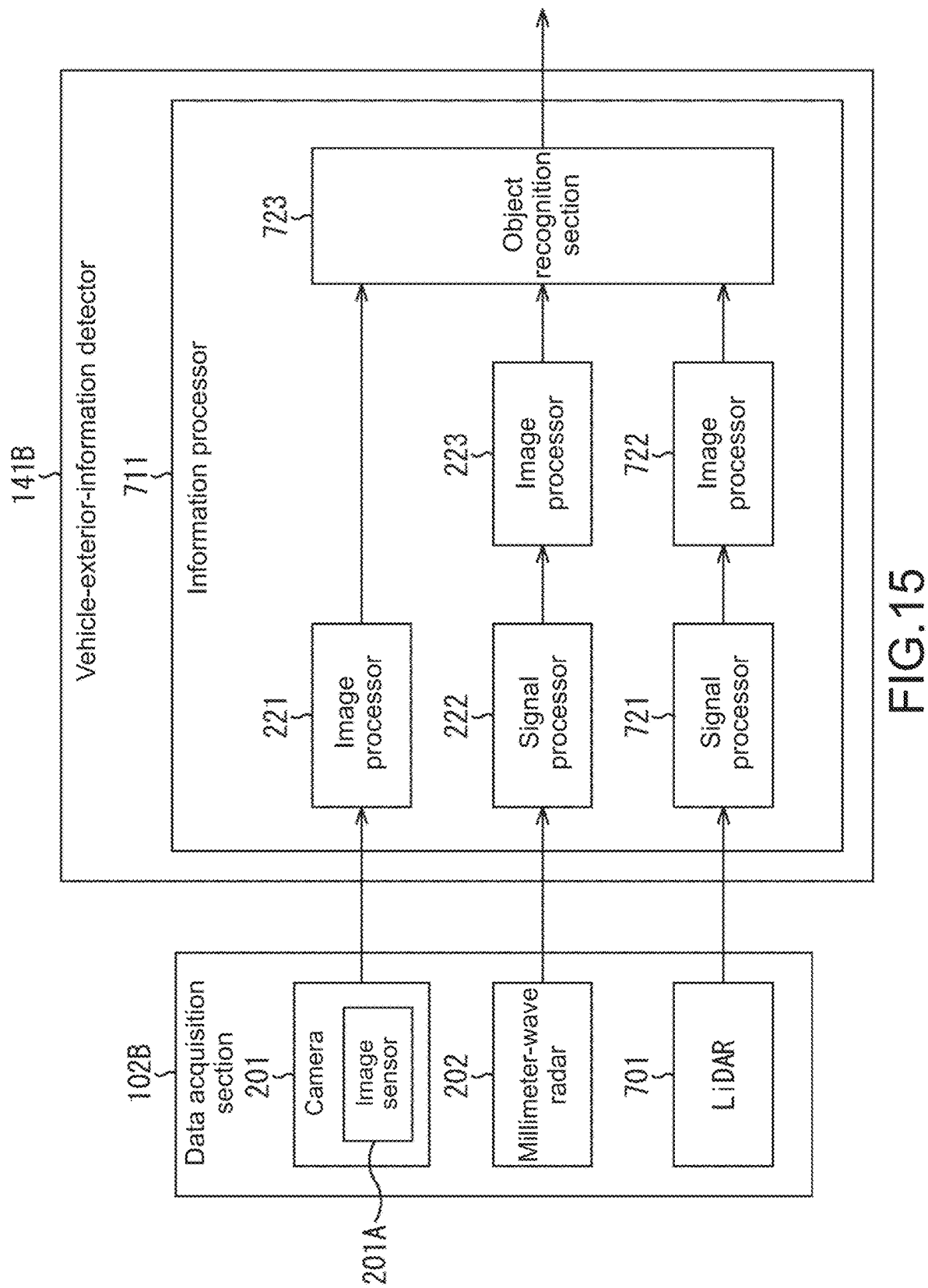
FIG. 15 is a block diagram illustrating a second embodiment of the data acquisition section and a second embodiment of the vehicle-exterior-information detector.

FIG. 15 illustrates examples of configurations of a data acquisition section 102B that is a second embodiment of the data acquisition section 102 in the vehicle control system 100 of FIG. 1, and a vehicle-exterior-information detector 141B that is a second embodiment of the vehicle-exterior-information detector 141 in the vehicle control system 100 of FIG. 1. Note that a portion in the figure that corresponds to a portion in FIG. 2 is denoted by the same reference numeral as FIG. 2, and a description thereof is omitted as appropriate.

The data acquisition section 102B is similar to the data acquisition section 102A in including the camera 201 and the millimeter-wave radar 202, and is different from the data acquisition section 102A in including LiDAR 701.

The vehicle-exterior-information detector 141B is different from the vehicle-exterior-information detector 141A in including an information processor 711 instead of the information processor 211. The information processor 711 is similar to the information processor 211 in including the image processor 221, the signal processor 222, and the image processor 223. On the other hand, the information processor 711 is different from the information processor 211 in including an object recognition section 723 instead of the object recognition section 224, and in that a signal processor 721 and an image processor 722 are added.

The LiDAR 701 performs sensing with respect to a region situated ahead of the vehicle 10, and sensing ranges of the LiDAR 701 and the camera 201 at least partially overlap. For example, the LiDAR 701 performs scanning with a laser pulse in the lateral direction and in the height direction with respect to the region situated ahead of the vehicle 10, and receives reflected light that is a reflection of the laser pulse. The LiDAR 701 calculates a distance to an object situated ahead of the vehicle 10 on the basis of the time taken to receive the reflected light, and on the basis of a result of the calculation, the LiDAR 701 generates three-dimensional group-of-points data (point cloud) that indicates a shape and a location of the object situated ahead of the vehicle 10. The LiDAR 701 supplies the group-of-points data to the signal processor 721.

The signal processor 721 performs specified signal processing (for example, interpolation processing or processing of reduction in number) with respect to the group-of-points data, and supplies the image processor 722 with the group-of-points data on which the signal processing has been performed.

The image processor 722 performs specified image processing on the group-of-points data to generate an estimated-location image indicating an estimated location of a target object in a coordinate system identical to the coordinate system of a captured image, as in the case of the image processor 223. The image processor 722 supplies the estimated-location image to the object recognition section 723.

Note that an image processing model similar to, for example, the image processing model 301 of FIG. 3 is used for the image processor 722, although a detailed description thereof is omitted. The image processing model for the image processor 722 is caused to perform learning using training data that includes input data and correct answer data, the input data including group-of-points data, the correct answer data being generated on the basis of the captured image.

Note that the estimated-location image generated by the image processor 223 on the basis of a millimeter-wave image is referred to as a millimeter-wave-based estimated-location image, and an estimated-location image generated by the image processor 722 on the basis of group-of-points data is referred to as a group-of-points-based estimated-location image.

The object recognition section 723 performs processing of recognizing a target object situated ahead of the vehicle 10 on the basis of an R image, a G image, a B image, a millimeter-wave-based estimated-location image, and a group-of-points-based estimated-location image. The object recognition section 723 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

Note that an object recognition model similar to, for example, the object recognition model 351 of FIG. 4 is used for the object recognition section 723, although a detailed description thereof is omitted. The object recognition model for the object recognition section 723 is caused to perform learning using training data that includes input data and correct answer data, the input data including five-channel image data that are an R image, a G image, a B image, a millimeter-wave-based estimated-location image, and a group-of-points-based estimated-location image, the correct answer data being generated on the basis of a captured image.

As described above, the addition of the LiDAR 701 results in further improving the accuracy in recognizing a target object.

3. Modifications

Modifications of the embodiments of the present technology described above are described below.

The example in which a vehicle is a recognition target has been primarily described above. However, as described above, any object other than a vehicle may be a recognition target. For example, it is sufficient if leaning processing is performed on the image processing model 301 and the object recognition model 351 using training data that includes correct answer data indicating a location of a target object to be recognized.

Further, the present technology is also applicable to the case of recognizing a plurality of types of objects. For example, it is sufficient if leaning processing is performed on the image processing model 301 and the object recognition model 351 using training data that includes correct answer data indicating a location and a label (the type of target object) of each target object.

The example of performing learning processing while generating training data has been described with reference to FIGS. 7 to 9. However, for example, learning processing may be performed after necessary training data is generated in advance.

The example of recognizing a target object situated ahead of the vehicle 10 has been described above. However, the present technology is also applicable to the case of recognizing a target object situated around the vehicle 10 in another direction, as viewed from the vehicle 10.

Further, the present technology is also applicable to the case of recognizing a target object around a mobile object other than a vehicle. For example, it is conceivable that the present technology could be applied to a mobile object such as a motorcycle, a bicycle, personal mobility, an airplane, a ship, construction machinery, and agricultural machinery (a tractor). Further, examples of the mobile object to which the present technology is applicable also include a mobile object, such as a drone and a robot, that is remotely operated by a user without the user getting on the mobile object.

Furthermore, the present technology is also applicable to the case of performing processing of recognizing a target object at a fixed place such as a monitoring system.

Moreover, the image processing model 301 of FIG. 3 and the object recognition model 351 of FIG. 4 are merely examples, and models other than the image processing model 301 and the object recognition model 351 that are generated by machine learning may also be used.

Further, the present technology is also applicable to the case of performing processing of recognizing a target object by a camera (an image sensor) and LiDAR being used in combination.

Furthermore, the present technology is also appliable to the case of using a sensor that detects an object and is other than a millimeter-wave radar and LiDAR.

Further, the present technology is also applicable when a millimeter-wave radar has a resolving power in the height direction, that is, when a millimeter-wave radar is capable of detecting a location (an angle) in the height direction of an object.

Figure 16:
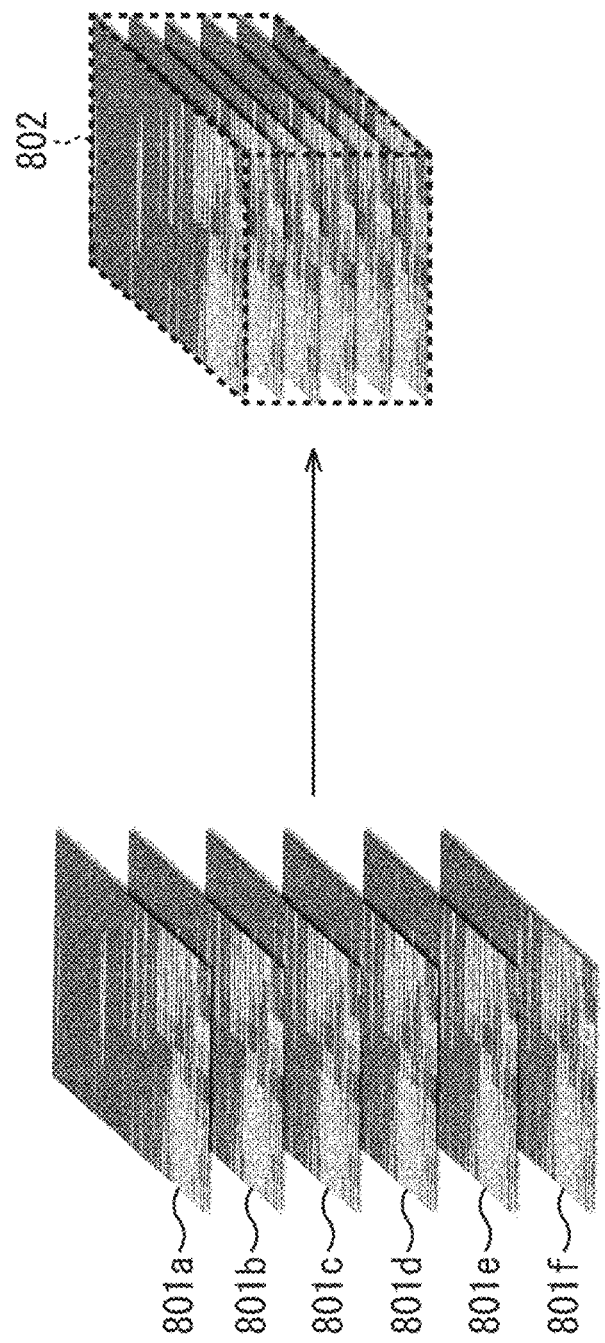
FIG. 16 is a diagram for describing processing performed when a millimeter-wave radar has a resolving power in the height direction.

For example, when the resolving power of the millimeter-wave radar in the height direction is 6, millimeter-wave images 801*a* to 801*f* corresponding to different heights are generated on the basis of millimeter-wave data, as illustrated in FIG. 16. In this case, for example, it is sufficient if the image processing model 301 may be caused to perform learning using training data that includes input data including six-channel image data 802 that are the millimeter-wave images 801*a* to 801*f*.

Alternatively, for example, the millimeter-wave images 801*a* to 801*f* may be combined to generate a single millimeter-wave image, and the image processing model 301 may be caused to perform learning using training data that includes input data including the generated millimeter-wave image.

Figure 17:
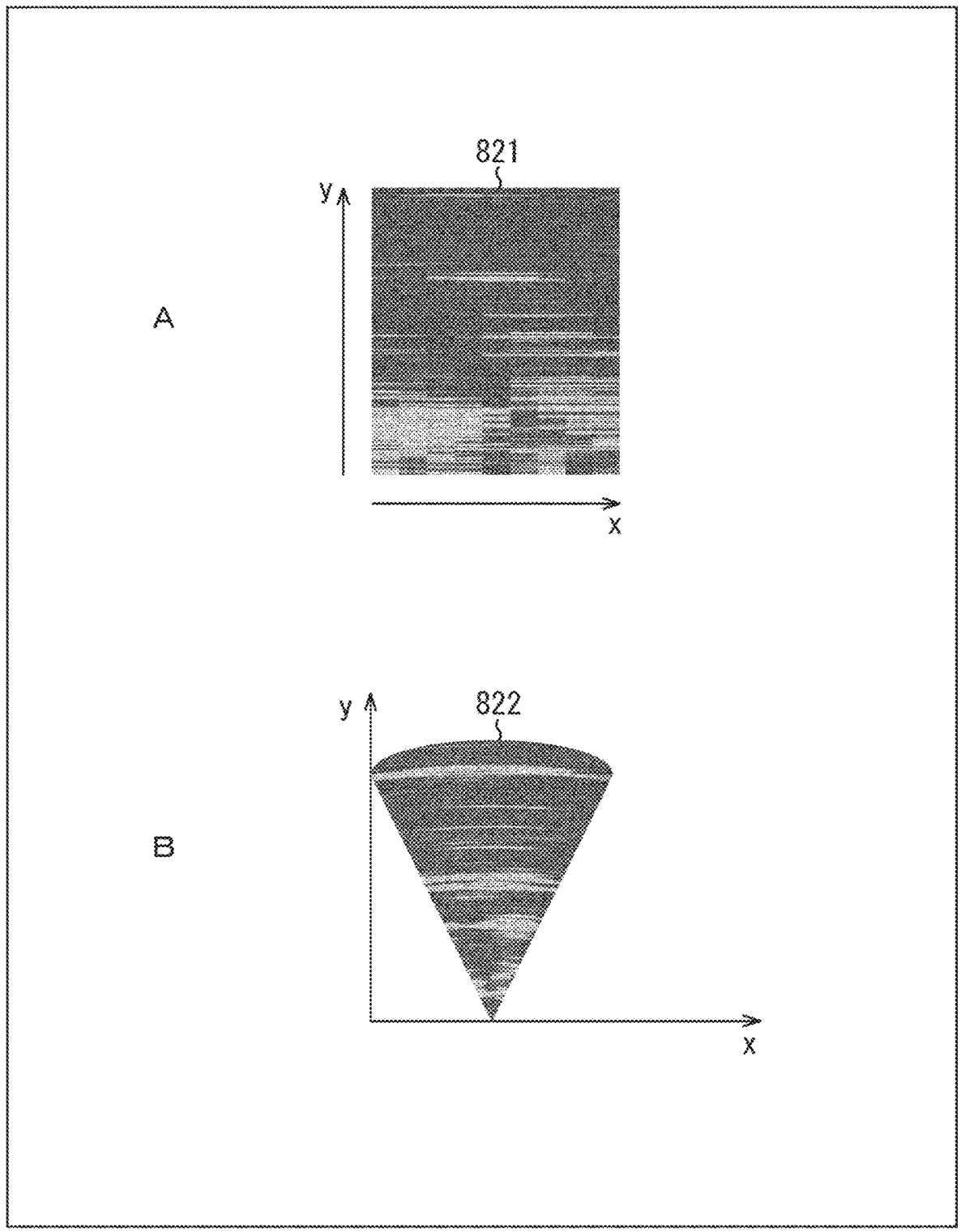
FIG. 17 illustrates a modification of a millimeter-wave image.

Further, for example, a millimeter-wave image 822 of B of FIG. 17 may be used instead of a millimeter-wave image 821 of A of FIG. 17.

In the millimeter-wave image 821, an x-axis represents an angle of an object relative to the optical-axis direction of the millimeter-wave radar 202, and a y-axis represents a distance to the object, as in the case of the millimeter-wave image 501 of FIG. 8.

On the other hand, in the millimeter-wave image 822, an x-axis represents the lateral direction (the width direction of the vehicle 10), and a y-axis represents the optical-axis direction of the millimeter-wave radar 202 (the traveling direction of the vehicle 10). In the millimeter-wave image 822, a location of an object situated ahead of the vehicle 10, and a distribution of the reflection intensity of each object, that is, a distribution of the intensity of a reception signal reflected off the object situated ahead of the vehicle 10 are given with a bird's-eye view.

The millimeter-wave image 822 is generated on the basis of the millimeter-wave image 821, and the use of the millimeter-wave image 822 makes it easier to visually grasp the location of an object situated ahead of the vehicle 10, compared to when the millimeter-wave image 821 is used. However, a portion of information is lost when the millimeter-wave image 821 is transformed into the millimeter-wave image 822. Thus, the degree of accuracy in recognizing a target object is higher when the millimeter-wave image 821 is used without any change.

4. Others

<Example of Configuration of Computer>

The series of processes described above can be performed using hardware or software. When the series of processes is performed using software, a program included in the software is installed on a computer. Here, examples of the computer include a computer incorporated into dedicated hardware, and a computer such as a general-purpose personal computer that is capable of performing various functions by various programs being installed thereon.

Figure 18:
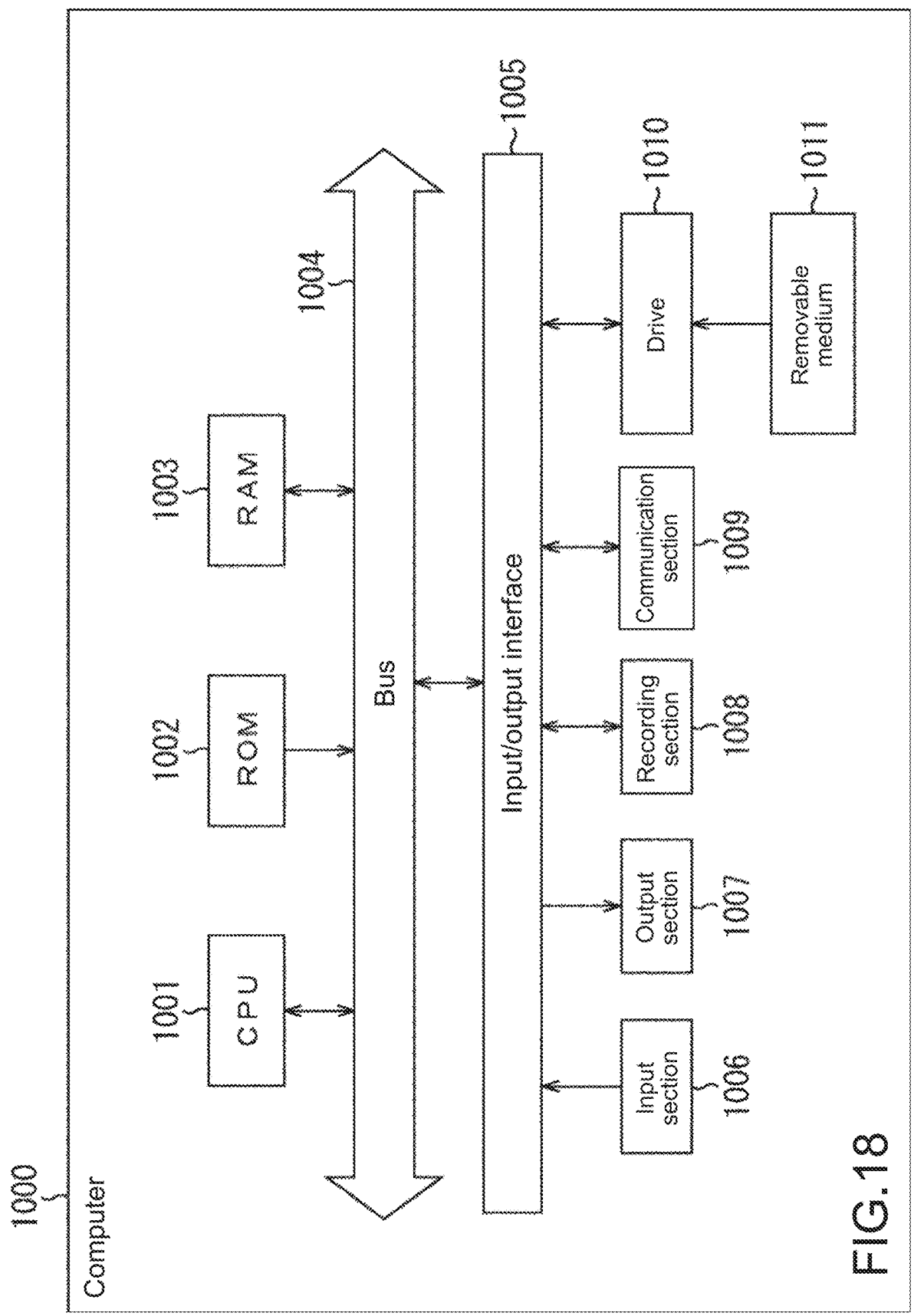
FIG. 18 illustrates an example of a configuration of a computer.

FIG. 18 is a block diagram of an example of a configuration of hardware of a computer that performs the series of processes described above using a program.

In the computer 1000, a central processing unit (CPU) 1001, a read only memory (ROM) 1002, and a random access memory (RAM) 1003 are connected to one another through a bus 1004.

Further, an input/output interface 1005 is connected to the bus 1004. An input section 1006, an output section 1007, a recording section 1008, a communication section 1009, and a drive 1010 are connected to the input/output interface 1005.

The input section 1006 includes, for example, an input switch, a button, a microphone, and an imaging element. The output section 1007 includes, for example, a display and a speaker. The recording section 1008 includes, for example, a hard disk and a nonvolatile memory. The communication section 1009 includes, for example, a network interface. The drive 1010 drives a removable medium 1011 such as a magnetic disk, an optical disk, a magneto-optical disk, or a semiconductor memory.

In the computer 1000 having the configuration described above, the series of processes described above is performed by the CPU 1001 loading, for example, a program recorded in the recording section 1008 into the RAM 1003 and executing the program via the input/output interface 1005 and the bus 1004.

For example, the program executed by the computer 1000 (the CPU 1001) can be provided by being recorded in the removable medium 1011 serving as, for example, a package medium. Further, the program can be provided via a wired or wireless transmission medium such as a local area network, the Internet, or digital satellite broadcasting.

In the computer 1000, the program can be installed on the recording section 1008 via the input/output interface 1005 by the removable medium 1011 being mounted on the drive 1010. Further, the program can be received by the communication section 1009 via the wired or wireless transmission medium to be installed on the recording section 1008. Moreover, the program can be installed in advance on the ROM 1002 or the recording section 1008.

Note that the program executed by the computer may be a program in which processes are chronologically performed in the order of the description herein, or may be a program in which processes are performed in parallel or a process is performed at a necessary timing such as a timing of calling.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Furthermore, the embodiment of the present technology is not limited to the examples described above, and various modifications may be made thereto without departing from the scope of the present technology.

For example, the present technology may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

<Example of Combination of Configurations>

The present technology may also take the following configurations.

(1) An information processing apparatus, including:
an image processor that generates an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and
an object recognition section that performs processing of recognizing the target object on the basis of the captured image and the estimated-location image.

(2) The information processing apparatus according to (1), in which
the image processor generates the estimated-location image using an image processing model obtained by machine learning.

(3) The information processing apparatus according to (2), in which
the image processing model is caused to perform learning using training data that includes input data and correct answer data, the input data including the sensor image, the correct answer data indicating a location of the target object in the captured image.

(4) The information processing apparatus according to (3), in which
the correct answer data is a binary image that indicates a region, in the captured image, in which there exists the target object.

(5) The information processing apparatus according to (3) or (4), in which
the image processing model is a model using a deep neural network.

(6) The information processing apparatus according to (5), in which
the image processing model includes
a feature-amount extraction section that extracts a feature amount of the sensor image to generate a feature map indicating a distribution of the feature amount in the first coordinate system,
a geometric transformation section that transforms the feature map in the first coordinate system into the feature map in the second coordinate system, and
a deconvolution section that deconvolves the feature map in the second coordinate system to generate the estimated-location image.

(7) The information processing apparatus according to any one of (1) to (6), in which
the objection recognition section performs the processing of recognizing the target object using an objection recognition model obtained by machine learning.

(8) The information processing apparatus according to (7), in which
the object recognition model is caused to perform learning using training data that includes input data and correct answer data, the input data including the captured image and the estimated-location image, the correct answer data indicating a location of the target object in the captured image.

(9) The information processing apparatus according to (8), in which
the object recognition model is a model using a deep neural network.

(10) The information processing apparatus according to (9), in which
the object recognition model includes
a first convolutional neural network that extracts feature amounts of the captured image and the estimated-location image, and
a second convolutional neural network that recognizes the target object on the basis of the feature amounts of the captured image and the estimated-location image.

(11) The information processing apparatus according to any one of (1) to (10), in which
the image sensor and the sensor perform sensing with respect to surroundings of a mobile object, and
the object recognition section performs the processing of recognizing the target object in the surroundings of the mobile object.

(12) The information processing apparatus according to any one of (1) to (11), in which
the sensor includes a millimeter-wave radar, and
the sensor image indicates a location of an object off which a transmission signal from the millimeter-wave radar is reflected.

(13) The information processing apparatus according to (12), in which
the first coordinate system is defined by an axis that represents an angle to an optical-axis direction of the millimeter-wave radar, and by an axis that represents a distance to the object.

(14) The information processing apparatus according to (12), in which
the millimeter-wave radar has a resolving power in a height direction, and
the image processor generates the estimated-location image on the basis of a plurality of the sensor images corresponding to different heights.

(15) The information processing apparatus according to any one of (1) to (14), in which
the sensor includes light detection and ranging (LiDAR), and
the sensor image is group-of-points data obtained by the LiDAR.

(16) An information processing method, including:
generating, by an information processing apparatus, an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and
performing, by the information processing apparatus, processing of recognizing the target object on the basis of the captured image and the estimated-location image.

(17) A program for causing a computer to perform a process including:
generating an estimated-location image on the basis of a sensor image that indicates, in a first coordinate system, a sensing result of a sensor of which a sensing range at least partially overlaps a sensing range of an image sensor, the estimated-location image indicating an estimated location of a target object in a second coordinate system identical to a coordinate system of a captured image obtained by the image sensor; and
performing processing of recognizing the target object on the basis of the captured image and the estimated-location image.

(18) A mobile-object control apparatus, including:
an image processor that generates an estimated-location image on the basis of a sensor image that indicates, in a first coordinate system, a sensing result of a sensor of which a sensing range at least partially overlaps a sensing range of an image sensor that captures an image of surroundings of a mobile object, the estimated-location image indicating an estimated location of a target object in a second coordinate system identical to a coordinate system of a captured image obtained by the image sensor;
an object recognition section that performs processing of recognizing the target object on the basis of the captured image and the estimated-location image; and
a movement controller that controls movement of the mobile object on the basis of a result of the recognition of the target object.

(19) A mobile object, including:
an image sensor;
a sensor of which a sensing range at least partially overlaps a sensing range of the image sensor;
an image processor that generates an estimated-location image on the basis of a sensor image that indicates a sensing result of the sensor in a first coordinate system, the estimated-location image indicating an estimated location of a target object in a second coordinate system identical to a coordinate system of a captured image obtained by the image sensor;
an object recognition section that performs processing of recognizing the target object on the basis of the captured image and the estimated-location image; and
a movement controller that controls movement of the mobile object on the basis of a result of the recognition of the target object.

Note that the effects described herein are not limitative but are merely illustrative, and other effects may be provided.

REFERENCE SIGNS LIST 10 vehicle
100 vehicle control system
102, 102A, 102B data acquisition section
107 drivetrain controller
108 drivetrain system
135 movement controller
141, 141A, 141B vehicle-exterior-information detector
201 camera
201A image sensor
202 millimeter-wave radar
211 information processor
221 image processor
222 signal processor
223 image processor
224 object recognition section
301 image processing model
311 feature-amount extraction section
312 geometric transformation section
313 deconvolution section
351 object recognition model
361 feature-amount extraction section
362 recognition section
401 learning system
414 training data generator
415 learning section
451 learning system
466 training data generator
467 learning section
701 LiDAR
711 information processor
721 signal processor
722 image processor
723 object recognition section

The invention claimed is:

1. An information processing apparatus, comprising:
at least one processor configured to:
generate, using a model obtained by machine learning, a first transformed sensor data based at least in part on first sensor data generated by a first sensor, wherein a sensing range of the first sensor at least partially overlaps a sensing range of a second sensor;
generate, using a second model obtained by machine learning, a second transformed sensor data based at least in part on second sensor data generated by the second sensor; and
recognize a target object based at least in part on the first transformed sensor data and the second transformed sensor data.

2. The information processing apparatus according to claim 1, wherein:
the target object is recognized based at least in part on the first transformed sensor data, the second transformed sensor data, and third sensor data generated by a third sensor; and
the model obtained by machine learning is caused to perform learning using training data that includes input data and ground truth data, the input data including the first sensor data, the ground truth data indicating a location of the target object in the third sensor data.

3. The information processing apparatus according to claim 2, wherein
the ground truth data is a binary image that indicates a region, in the third sensor data, in which there exists the target object.

4. The information processing apparatus according to claim 2, wherein
the model obtained by machine learning is a model using a deep neural network.

5. The information processing apparatus according to claim 4, wherein
the model obtained by machine learning includes:
a feature-amount extraction section that extracts a feature amount of the first sensor data to generate a feature map indicating a distribution of the feature amount in a first coordinate system,
a geometric transformation section that transforms the feature map in the first coordinate system into the feature map in a second coordinate system, wherein the second coordinate system is identical to a coordinate system of the third sensor data, and
a deconvolution section that deconvolves the feature map in the second coordinate system to generate the first transformed sensor data.

6. The information processing apparatus according to claim 2, wherein
the target object is recognized using an object recognition model obtained by machine learning.

7. The information processing apparatus according to claim 6, wherein
the object recognition model is caused to perform learning using training data that includes input data and ground truth data, the input data including the third sensor data and the first transformed sensor data, the ground truth data indicating a location of the target object in the third sensor data.

8. The information processing apparatus according to claim 7, wherein
the object recognition model is a model using a deep neural network.

9. The information processing apparatus according to claim 8, wherein
the object recognition model includes:
a first convolutional neural network that extracts feature amounts of the first transformed sensor data and the third sensor data, and
a second convolutional neural network that recognizes the target object based at least in part on the feature amounts of the first transformed sensor data and the third sensor data.

10. The information processing apparatus according to claim 6, wherein
the first sensor and the second sensor perform sensing with respect to surroundings of a mobile object, and
the object recognition model recognizes the target object in the surroundings of the mobile object.

11. The information processing apparatus according to claim 1, wherein
the first sensor includes a radar, and
the first sensor data indicates a location of an object off which a transmission signal from the radar is reflected.

12. The information processing apparatus according to claim 11, wherein
a first coordinate system of the first sensor is defined by an axis that represents an angle to an optical-axis direction of the radar, and by an axis that represents a distance to the object.

13. The information processing apparatus according to claim 11, wherein
the radar has a resolving power in a height direction, and
the processor is configured to generate the first transformed sensor data on a basis of a plurality of sensor images corresponding to different heights.

14. The information processing apparatus according to claim 1, wherein
the first sensor includes light detection and ranging (LiDAR), and
the first sensor data is group-of-points data obtained by the LiDAR.

15. An information processing method, comprising:
using at least one processor to perform:
generating, using a model obtained by machine learning, a first transformed sensor data, based at least in part on first sensor data generated by a first sensor, wherein a sensing range of the first sensor at least partially overlaps a sensing range of a second sensor;
generating a second transformed sensor data, using a second model obtained by machine learning, based at least in part on second sensor data generated by the second sensor; and
recognizing a target object based at least in part on the first transformed sensor data and second transformed sensor data.

16. At least one non-transitory computer readable storage medium, storing a program for causing a computer to perform a process, the process comprising:
generating, using a model obtained by machine learning, a first transformed sensor data, based at least in part on first sensor data generated by a first sensor, wherein a sensing range of the first sensor at least partially overlaps a sensing range of a second sensor;
generating a second transformed sensor data, using a second model obtained by machine learning, based at least in part on second sensor data generated by the second sensor; and
recognizing a target object based at least in part on the first transformed sensor data and second transformed sensor data.

17. The information processing apparatus of claim 1, wherein the target object is recognized based at least in part on the first transformed sensor data, the second transformed sensor data, and third sensor data generated by a third sensor.

18. A system comprising:
a first sensor configured to generate first sensor data;
a second sensor configured to generate second sensor data, wherein a sensing range of the first sensor at least partially overlaps with a sensing range of the second sensor; and
at least one processor configured to:
generate, using a machine learning model, first transformed sensor data based at least in part on the first sensor data;
generate, using a second machine learning model, a second transformed sensor data based at least in part on the second sensor data; and
recognize a target object based at least in part on the first transformed sensor data and the second transformed sensor data.

* * * * *